US012162363B2

(12) United States Patent
Javidan et al.

(10) Patent No.: US 12,162,363 B2
(45) Date of Patent: Dec. 10, 2024

(54) MODULAR SYSTEM FOR DYNAMIC TOW AND REGENERATIVE BRAKING OF A TRAILER

(71) Applicant: Range Energy Inc., Mountain View, CA (US)

(72) Inventors: Ali Javidan, Sunnyvale, CA (US); Kyle Foley, Half Moon Bay, CA (US); Bryan Booth, San Mateo, CA (US); Ryan Flatland, Redwood City, CA (US); Collin MacGregor, Redwood City, CA (US); Bobby Ng, Los Altos, CA (US); Arturo Bautista, Mountain View, CA (US); Jason Chua, Palo Alto, CA (US)

(73) Assignee: Range Energy Inc., Mountain View, CA (US)

( * ) Notice: Subject to any disclaimer, the term of this patent is extended or adjusted under 35 U.S.C. 154(b) by 0 days.

(21) Appl. No.: 18/388,474

(22) Filed: Nov. 9, 2023

(65) Prior Publication Data

US 2024/0067283 A1 Feb. 29, 2024

Related U.S. Application Data

(63) Continuation-in-part of application No. 18/238,408, filed on Aug. 25, 2023, now Pat. No. 11,965,795, and
(Continued)

(51) Int. Cl.
*B60L 15/20* (2006.01)
*B60B 35/00* (2006.01)
(Continued)

(52) U.S. Cl.
CPC ........ *B60L 15/2009* (2013.01); *B60B 35/005* (2013.01); *B60G 11/27* (2013.01);
(Continued)

(58) Field of Classification Search
CPC .... B60L 15/2009; B60L 7/10; B60L 15/2081; B60L 50/66; B60L 58/12; B60L 2200/28;
(Continued)

(56) References Cited

U.S. PATENT DOCUMENTS

2020/0233410 A1 * 7/2020 Burns ..................... B60L 50/66
2020/0238990 A1 * 7/2020 Ma ......................... B60W 30/18
(Continued)

FOREIGN PATENT DOCUMENTS

EP 3858714 A1 * 8/2021 .......... B62D 13/025
WO WO-9625302 A1 * 8/1996 ................ B60P 1/54

*Primary Examiner* — Jacob S. Scott
*Assistant Examiner* — Michael E Butler
(74) *Attorney, Agent, or Firm* — Run8 Patent Group, LLC; Peter Miller

(57) ABSTRACT

One variation of a system includes a bogie including: a chassis; a first set of latches configured to transiently engage a first subset of engagement features, in a first array of engagement features on a left rail and in a second array of engagement features on a right rail of the trailer, to retain the bogie below a floor of the trailer; a driven axle suspended from the chassis; and a motor coupled to the driven axle and configured to output torque to the driven axle and regeneratively brake the driven axle. The system further includes a battery assembly: including a second set of latches configured to transiently engage a second subset of engagement features, in the first array of engagement features and in the second array of engagement features, to retain the battery assembly adjacent the bogie; and configured to receive electrical energy from the motor.

20 Claims, 9 Drawing Sheets

Related U.S. Application Data a continuation-in-part of application No. 18/238,415, filed on Aug. 25, 2023, and a continuation-in-part of application No. 18/238,405, filed on Aug. 25, 2023.

(60) Provisional application No. 63/431,273, filed on Dec. 8, 2022, provisional application No. 63/420,469, filed on Oct. 28, 2022, provisional application No. 63/401,030, filed on Aug. 25, 2022.

(51) Int. Cl.

| | | |
|---|---|---|
| *B60G 11/27* | (2006.01) | |
| *B60K 1/04* | (2019.01) | |
| *B60K 7/00* | (2006.01) | |
| *B60L 7/10* | (2006.01) | |
| *B60L 50/60* | (2019.01) | |
| *B60R 16/033* | (2006.01) | |
| *B60T 13/36* | (2006.01) | |
| *B60T 17/22* | (2006.01) | |
| *B62D 53/06* | (2006.01) | |
| *B62D 53/08* | (2006.01) | |
| *B62D 59/04* | (2006.01) | |
| *B60L 58/12* | (2019.01) | |
| *B60P 3/20* | (2006.01) | |
| *B60T 13/38* | (2006.01) | |

(52) U.S. Cl.
CPC .............. *B60K 1/04* (2013.01); *B60K 7/0007* (2013.01); *B60L 7/10* (2013.01); *B60L 15/2081* (2013.01); *B60L 50/66* (2019.02); *B60R 16/033* (2013.01); *B60T 13/36* (2013.01); *B60T 17/22* (2013.01); *B62D 53/06* (2013.01); *B62D 53/0842* (2013.01); *B62D 59/04* (2013.01); *B60B 2900/351* (2013.01); *B60G 2202/152* (2013.01); *B60G 2400/51222* (2013.01); *B60K 2001/0438* (2013.01); *B60K 2001/0444* (2013.01); *B60L 58/12* (2019.02); *B60L 2200/28* (2013.01); *B60L 2240/461* (2013.01); *B60L 2240/642* (2013.01); *B60P 3/20* (2013.01); *B60T 13/38* (2013.01)

(58) Field of Classification Search
CPC ......... B60L 2240/461; B60L 2240/642; B60B 35/005; B60G 11/27; B60G 2400/51222; B60K 1/04; B60K 7/0007; B60K 2001/0438; B60K 2001/0444; B60R 16/033; B60T 13/36; B60T 17/22; B62D 53/06; B62D 53/0842; B62D 59/04; B60P 3/20
USPC .......................................................... 700/22
See application file for complete search history.

(56) References Cited

U.S. PATENT DOCUMENTS

| | | | |
|---|---|---|---|
| 2022/0169252 A1* | 6/2022 | Yhr | ............................ B60L 7/10 |
| 2023/0075054 A1* | 3/2023 | Haas | ....................... B60L 58/40 |

* cited by examiner

MODULAR SYSTEM FOR DYNAMIC TOW AND REGENERATIVE BRAKING OF A TRAILER

CROSS-REFERENCE TO RELATED APPLICATIONS

This Application is a continuation-in-part application of U.S. patent application Ser. No. 18/238,405, filed on 25 Aug. 2023, Ser. No. 18/238,408, filed on 25 Aug. 2023, and Ser. No. 18/238,415, filed on 25 Aug. 2023, which claim the benefit of U.S. Provisional Application No. 63/401,030, filed on 25 Aug. 2022, 63/420,469, filed on 28 Oct. 2022, and 63/431,273, filed on 8 Dec. 2022, each of which is incorporated in its entirety by this reference.

TECHNICAL FIELD

This invention relates generally to the field of overland trucking and more specifically to a new and useful system for dynamic tow and regenerative braking in the field of overland trucking.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1A:
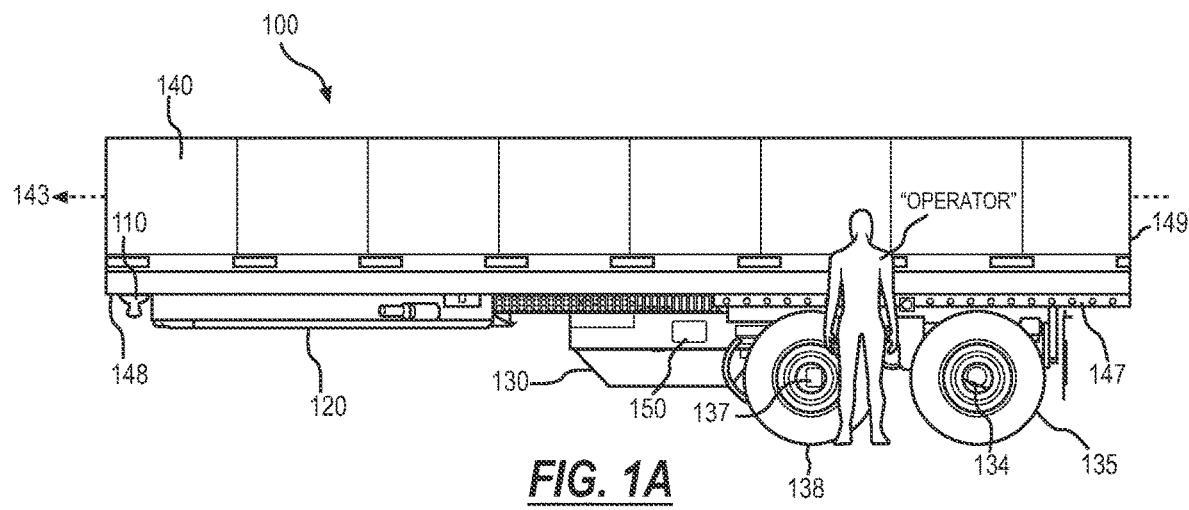
FIGS. 1A, 1B, and 1C is a schematic representation of a system.
Figure 1B:
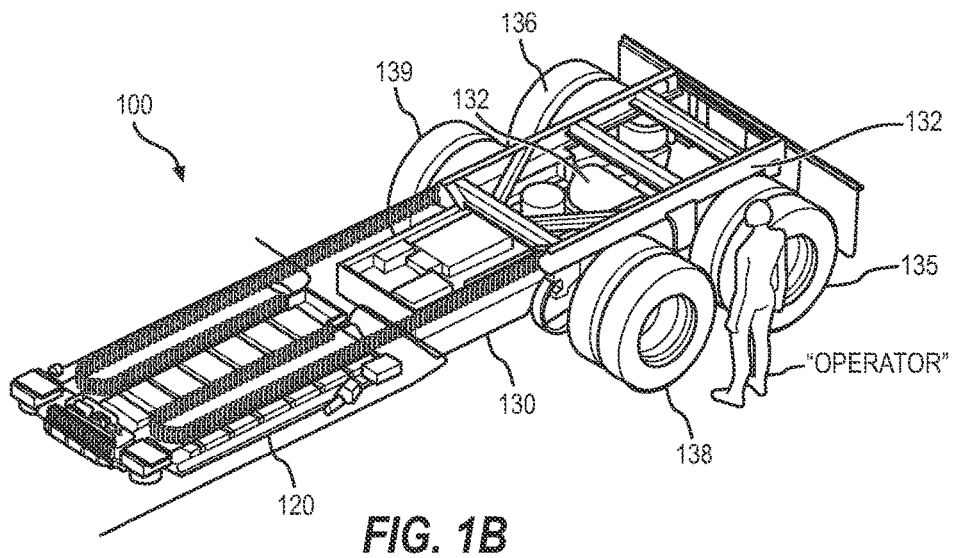
Figure 1C:
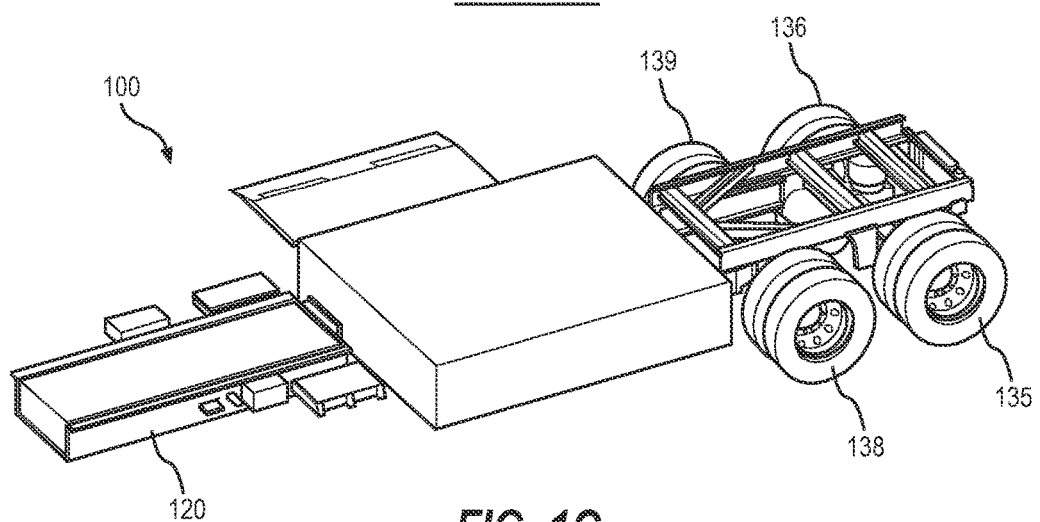

As shown in FIG. 1, a system 100 for tow control of a trailer 140 includes: a bogie 130; a battery assembly 120; and a controller 150. The bogie 130 includes: a chassis 132 configured to transiently install on a left rail 147 and a right rail 147 of the trailer 140 over a range of longitudinal positions; a first set of latches 133 configured to transiently engage a first subset of engagement features 144, in a first array of engagement features 144 on the left rail 147 and in a second array of engagement features 144 on the right rail 147, to retain the bogie 130 below a floor 146 of the trailer 140; a driven axle 137 suspended from the chassis 132; and a motor 131 coupled to the driven axle 137. The battery assembly 120 includes a second set of latches 133 configured to transiently engage a second subset of engagement features 144, in the first array of engagement features 144 on the left rail 147 and in the second array of engagement features 144 on the right rail 147, to retain the first battery assembly 120 below the floor 146 of the trailer 140. The controller 150 is configured to: trigger the first battery assembly 120 to supply electrical energy to the motor 131 to output torque to the driven axle 137 in a tow mode; and trigger the motor 131 to supply electrical energy to the first battery assembly 120 to regeneratively brake the driven axle 137 and charge the first battery assembly 120 in a regenerative braking mode.

In one variation, the system 100 includes: a trailer 140; a bogie 130; and a battery assembly 120. In this variation, the trailer 140 includes: a floor; a left rail 147 coupled to the floor, extending parallel to and laterally offset from a longitudinal centerline of the trailer 140, and defining a first array of engagement features 144 distributed along the left rail 147 and longitudinally offset by a pitch distance; and a right rail 147, coupled to the floor, extending parallel to and laterally offset from the longitudinal centerline of the trailer 140 opposite the left rail 147, and defining a second array of engagement features 144 distributed along the right rail 147 and longitudinally offset by the pitch distance.

In this variation, the bogie 130 further includes: a chassis 132; a first set of latches 133 configured to transiently engage a first subset of engagement features 144, in the first array of engagement features 144 and in the second array of engagement features 144, to retain the bogie 130 below the floor 146 of the trailer 140; a driven axle 137 suspended from the chassis 132; and a motor 131 coupled to the driven axle 137. The battery assembly 120 includes a second set of latches 133 configured to: transiently engage a second subset of engagement features 144, in the first array of engagement features 144 and in the second array of engagement features 144, to retain the battery assembly 120 below the floor 146 of the trailer 140 adjacent the bogie 130; and supply electrical energy to the motor 131.

In another variation, the system 100 includes a bogie 130 and a battery assembly 120. The bogie 130 includes: a chassis 132 configured to transiently install on the trailer 140 over a range of longitudinal positions; a first set of latches 133 configured to transiently engage a first subset of engagement features 144, in a first array of engagement features 144 on a left rail 147 of the trailer 140 and in a second array of engagement features 144 on the right rail 147 of the trailer 140, to retain the bogie 130 below a floor 146 of the trailer 140; a driven axle 137 suspended from the chassis 132; and a motor 131 coupled to the driven axle 137 and configured to output torque to the driven axle 137 and regeneratively brake the driven axle 137. The battery assembly 120: includes a second set of latches 133 configured to transiently engage a second subset of engagement features 144, in the first array of engagement features 144 and in the second array of engagement features 144, to retain the battery assembly 120 below the floor 146 of the trailer 140 adjacent the bogie 130; and is configured to receive electrical energy from the motor 131 to recharge the battery assembly 120.

2. Applications

Generally, the system 100 includes: a bogie 130 that transiently (e.g., temporarily) installs on a floor 146 of a trailer 140 over a range of longitudinal positions over time, includes a driven axle 137 and a motor 131 coupled to the driven axle 137; a battery assembly 120 or a set of modular batteries 120 that enable a user to selectively adjust the battery capacity as a function of a predicted distance traveled by the trailer 140, a weight distribution of the trailer 140, a type of the trailer 140 (e.g., a dry van trailer 140, a refrigerated trailer 140), and/or a length of the trailer 140 (e.g., 20 feet, 40 feet, 48 feet, 53 feet, 60 feet); and a controller 150 configured to trigger the battery assembly 120 to supply electrical energy to the motor 131 to output torque to the driven axle 137 in a tow mode and trigger the motor 131 to supply electrical energy to the battery assembly 120 to regeneratively brake the driven axle 137 and charge the battery assembly 120 in a regenerative braking mode.

In particular, the bogie 130 includes a set of latches 133—such as solenoids, manual latches, pneumatic latches, or other electromechanical latches—to configured to transiently engage corresponding engagement features 144 on the left rail 147 and the right rail 147, to retain the bogie 130 below the floor 146 of the trailer 140. Each latch is operable in an engaged position (e.g., a closed position) to engage and retain a corresponding engagement feature to couple the bogie 130 to the floor 146 of the trailer 140 and thereby, prevent unauthorized access and/or removal of the bogie 130 from the trailer 140. Further, each latch is operable in a disengaged position (e.g., an open position) to disengage from a corresponding engagement feature and decouple the bogie 130 from the floor 146 of the trailer 140 and thereby, enable a user to manually adjust the position of the bogie 130 or remove and service the bogie 130 (e.g., clean the bogie 130, replace the motor 131, clean the driven wheels) without additional tools.

Additionally, the system 100 is configured to dynamically tow and regeneratively brake a trailer 140 (e.g., a towed vehicle) by: selectively entering an operational mode (e.g., a tow mode, a regenerative braking mode, a service mode); selectively operating the motor 131 of the bogie 130 in a tow mode to output torque to the driven axle 137; detecting a direction of motion of the trailer 140; accessing signals output by sensors coupled to an emergency brake line (e.g., a supply brake line, a spring-brake relay), suspension systems, and wheels of the trailer 140; identify errors (e.g., sensor failure, pneumatic or mechanical brake failure of the trailer 140); interpret air pressures and a load distribution on the driven axle 137 via these sensors; leverage these air pressures and load distribution to automatically transition from the tow mode to the regenerative braking mode and vice versa; and, in a regenerative braking mode, trigger the motor 131 to selectively increase or decrease the supply of an electrical energy flux to the battery assembly 120 to regeneratively brake the driven axle 137 and charge the battery assembly 120 based on these signals and identified errors.

2.1 Tow Mode

In tow mode, the controller 150 can detect conditions of the trailer 140 such as: a direction of motion of the trailer 140 (e.g., a forward direction, a reverse direction); a tractor-trailer (e.g., a steering angle); a speed of the trailer 140; an incline angle of the trailer 140 (e.g., a grade of a ground surface); a location of the trailer 140; forces applied to the kingpin 110 (e.g., lateral forces, longitudinal forces, vertical forces, total forces); and/or a charge state of each battery assembly 120 coupled to the trailer 140 (e.g., a status, a level, a percentage). The controller 150 can then: calculate a target preload force proportional to and/or inversely proportional to the condition of the trailer 140; and trigger the battery assembly 120 to supply electrical energy to the motor 131 to increase torque output and/or reduce torque output to the driven axle 137 in the direction of motion of the trailer 140 to decrease a difference between the target preload force and a total force applied to the kingpin (e.g., an actual force) to control the trailer 140 in conjunction with the tow vehicle.

2.2 Regenerative Braking Mode

The controller 150 can leverage signals output by a pressure sensor 115 coupled to a spring-brake relay of a tow vehicle to automatically transition from the tow mode to the regenerative braking mode and vice versa.

Furthermore, the controller 150 can leverage air signals received from the tow vehicle via the gladhand, the target preload force, and signals output from a set of wheel speed sensors to automatically apply a proportion of braking force to the driven axle 137 from the pneumatic or mechanical brake system of the trailer 140 and/or regeneratively brake the driven axle 137, and thereby, maintain traction between the driven wheels of the trailer 140 and a ground surface.

Therefore, the controller 150 can leverage the dynamic target preload force, torque output, and regenerative braking: to prevent a jackknife event between the tow vehicle and the trailer 140 (e.g., tow vehicle brakes to a stop and the trailer 140 continues to move toward and push the tow vehicle or torque applied to the kingpin); to prevent wheel lockup of the trailer 140; to maintain traction between the driven wheels of the trailer 140 and a ground surface; to reduce emissions by the tow vehicle; to decrease fuel consumption by the tow vehicle; to extend the life of each battery assembly 120 coupled to the trailer 140; and to enable a driver of the tow vehicle to apply minimal to no brake force to the trailer 140.

2.3 Example Configurations

Figure 4A:
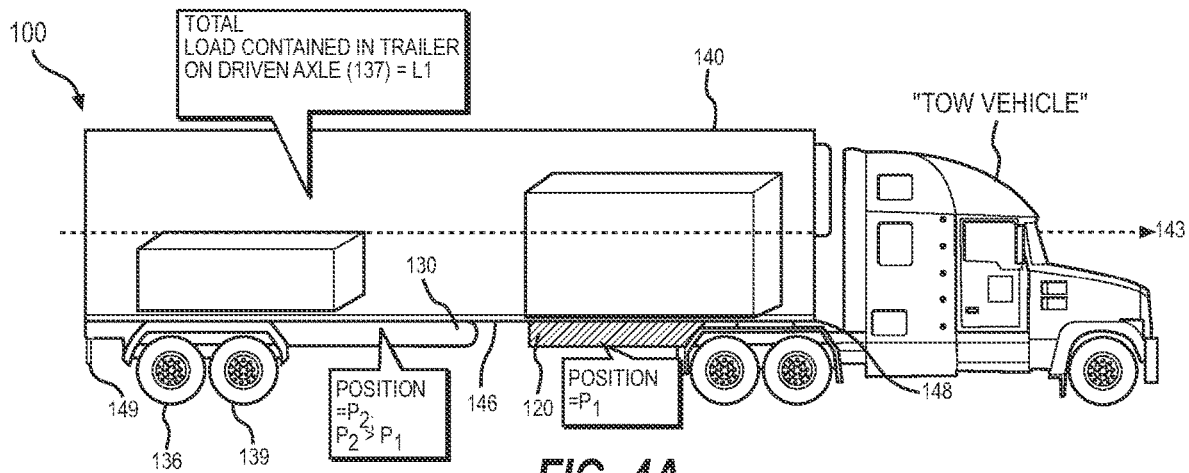
FIGS. 4A, 4B, and 4C are schematic representations of one variation of the system.
Figure 4B:
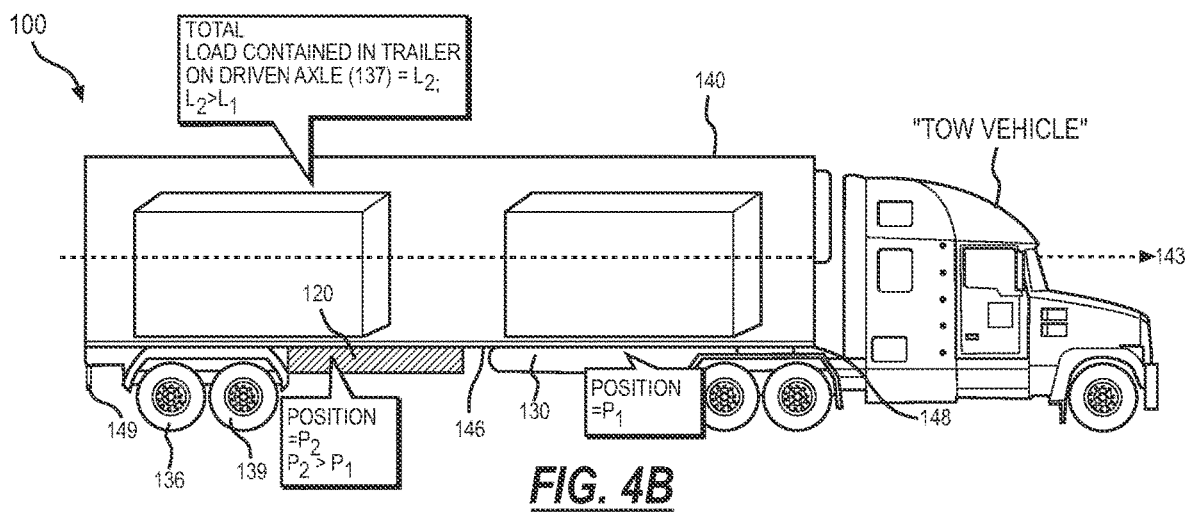
Figure 4C:
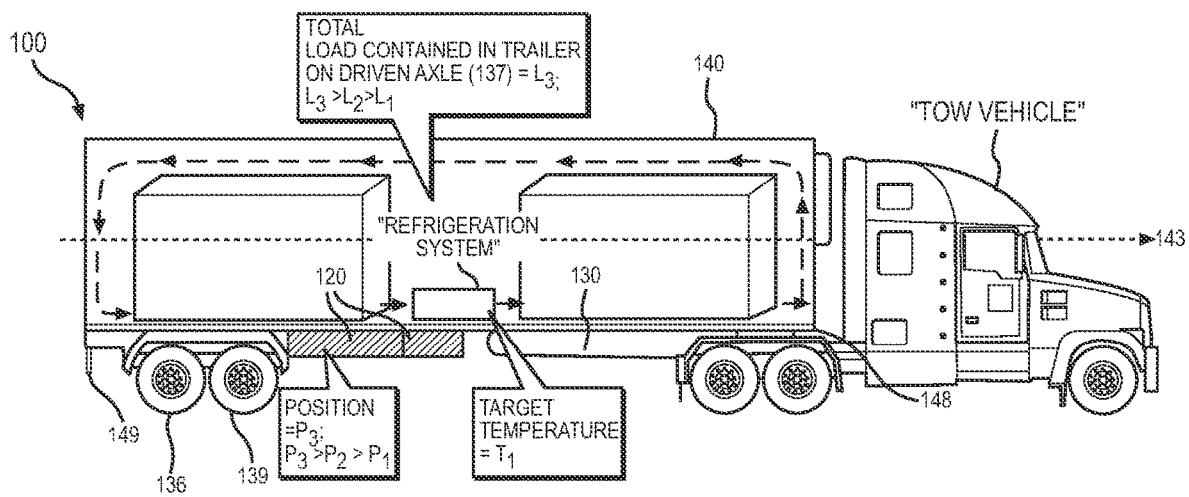

Generally, a trailer 140 includes a left rail 147 and a right rail 147 that couple to a floor 146 of the trailer 140. The left rail 147 and the right rail 147 run along a longitudinal axis 143 of the trailer 140, extending parallel to and laterally offset from a longitudinal centerline, such that when coupled to a bogie 130, a user (e.g., an operator, a driver, a technician) or a machine may manipulate the bogie 130 along the left rail 147 and the right rail 147 to a target position (e.g., a longitudinal position) below the floor 146 of the trailer 140 and thus, transiently install the bogie 130 below the floor 146 of the trailer 140 over a range of longitudinal positions. More specifically, the user or machine may manipulate the bogie 130 and a battery assembly 120, electrically coupled to the bogie 130, along the left rail 147 and the right rail 147 to a target position as a function of weight distribution (e.g., a payload) of the trailer 140, as shown in FIGS. 4A, 4B, and 4C.

For example, an operator may install the bogie 130 and the battery assembly 120 to target positions to support (e.g., balance) a weight distribution of the trailer 140 on the driven axle 137. In this example, the user may install the battery assembly 120 on the left rail 147 and the right rail 147 (e.g., via latches 133) and arrange the battery assembly 120 in a first position on a proximal end of the trailer 140 (e.g., facing a hitch of a tow vehicle). Then, the user may install the bogie 130 on the left rail 147 and the right rail 147 (e.g., via latches 133) and manipulate the bogie 130 along the longitudinal axis 143 of the trailer 140 to arrange the bogie 130 in an opposite position on the distal end of the trailer 140 within a threshold distance of the battery assembly 120 to balance a weight of the trailer 140, containing a first load, on the driven axle 137.

Alternatively, in this example, the user may install the bogie 130 on the left rail 147 and the right rail 147 (e.g., via latches 133) and manipulate the bogie 130 along the longitudinal axis 143 of the trailer 140 to arrange the bogie 130 in a first position on the proximal end of the trailer 140 (e.g., facing a hitch of a tow vehicle). Then, the user may install the battery assembly 120 on the left rail 147 and the right rail 147 (e.g., via latches 133) and manipulate the bogie 130 along the longitudinal axis 143 of the trailer 140 to arrange the battery assembly 120 in an opposite position on the distal end of the trailer 140 within a threshold distance of the bogie 130 to balance a weight of the trailer 140, containing a load different from the first load, on the driven axle 137.

3. Trailer

The trailer 140 includes a floor 146 and a set of rails 147 coupled to the floor 146. The left rail 147 and the right rail 147 run along a longitudinal axis 143 of the trailer 140, extending parallel to and laterally offset from a longitudinal centerline, to form a channel below the floor 146 of the trailer.

In one implementation the trailer 140 includes: a floor 146; a left rail 147 coupled to the floor 146, extending parallel to and laterally offset from a longitudinal centerline 143 of the trailer 140, and defining a first array of engagement features 144 distributed along the left rail 147 and longitudinally offset by a pitch distance; and a right rail 147 coupled to the floor 146, extending parallel to and laterally offset from the longitudinal centerline 143 of the trailer 140 opposite the left rail 147, and defining a second array of engagement features 144 distributed along the right rail 147 and longitudinally offset by the pitch distance. In this implementation, the set of rails 147 extend along a length of the trailer 140 and define a channel below the floor 146 of the trailer 140. Alternatively, the set of rails 147 extend along a portion of the length of the trailer 140 and define a channel below the floor 146 of the trailer 140.

Additionally, the left rail 147 and the right rail 147 are configured to run along a longitudinal axis 143 of the trailer 140, parallel to the longitudinal centerline, such that, when coupled to a bogie 130, a user (e.g., an operator, a driver, a technician) or a machine may manipulate the bogie 130 between the left rail 147 and the right rail 147 to guide the bogie 130 to a target position (e.g., a longitudinal position) below the floor 146 of the trailer 140 and/or to remove the bogie 130 from the floor 146 of the trailer 140 in a service mode.

Furthermore, the set of engagement features 144 can include a bore, a slot, an aperture, or an indentation distributed along each rail 147 and configured to engage and retain a corresponding latch of a bogie 130 and/or a battery assembly 120, as further described below. However, each rail 147 can include any other type of engagement feature configured to engage and retain a set of latches 133 of a bogie 130 and/or a battery assembly 120.

4. Bogie

Generally, the bogie 130 includes: a chassis 132; a set of latches 133; a driven axle 137 suspended from the chassis 132; and a motor 131 coupled to the driven axle 137.

In one implementation, the bogie 130 includes: a chassis 132 configured to transiently install on a left rail 147 and a right rail 147 of a trailer 140 over a range of longitudinal positions; a set of latches 133 configured to transiently engage a subset of engagement features 144, in the first array of engagement features 144 on the left rail 147 and in the second array of engagement features 144 on the right rail 147, to retain the bogie 130 below the floor 146 of the trailer 140; a driven axle 137 suspended from the chassis 132; and a motor 131 coupled to the driven axle 137 configured to output torque to the driven axle 137 in a tow mode and regeneratively brake the driven axle 137 in a regenerative braking mode.

The chassis 132 is configured to transiently install on a trailer 140 over a range of longitudinal positions and supports the driven axle 137. The chassis 132 can be manufactured from a metal such as galvanized steel or stainless steel and coupled to the floor 146 of the trailer 140. Additionally, the chassis 132 can be mounted to the floor 146 such as by welding the chassis 132 to the floor 146 of the trailer 140 or bolting the chassis 132 to the floor 146 of the trailer 140 via a set of fasteners.

In one variation, the bogie 132 further includes a secondary battery assembly 108 mounted to the chassis 132 of the bogie 130, and the controller 150 can trigger the secondary battery assembly 108 to supply electrical energy to the motor 131 to assist motion of the bogie 130 away from the trailer 140 in a service mode.

In another variation, the bogie 130 includes a suspension system, such as a leaf suspension system, a rubber block suspension system, or an air-ride suspension system coupled to the driven axle 137. For example, the bogie 130 can include an air-ride suspension system that includes: a first air bag arranged proximal a left driven wheel 138 of the driven axle 137; and a second air bag arranged proximal a right driven wheel 139 of the driven axle 137. The bogie 130 can further include a pressure sensor 115 coupled to the driven axle 137 and configured to output a signal representing a combined air pressure in the first air bag and the second air bag. In this variation, the controller 150 is configured to leverage the air-ride suspension system and the pressure sensor 115 to monitor air pressure in the first and second air bags and calculate a weight of the trailer 140, containing a load, on the driven axle 137 based on the air pressure in the first and second air bags.

In yet another variation, the bogie 130 includes a compressed-air-brake system configured to couple to a gladhand of a brake line from a tow vehicle coupled to the trailer 140 and brake the driven axle 137 responsive to air signals received from the tow vehicle via the gladhand. For example, a user (e.g., a technician, an operator) may manually couple a supply line (e.g., an emergency brake line) and a control line (e.g., a service brake line) of the trailer 140 to a compressed air supply line of a tow vehicle via a set of hose couplings (e.g., a gladhand coupler, a gladhand connector). The user may then couple a compressed-air-brake system of the bogie 130 to the gladhand coupling between the tractor and the trailer 140. The controller 150 can then leverage the compressed air signal from the tow vehicle via the gladhand to selectively brake the driven axle 137 via the pneumatic or mechanical brake system of the trailer 140 and/or enter a regenerative braking mode and alternate the proportion of braking from the pneumatic or mechanical brake system of the trailer 140 and from regenerative braking.

Further, the system 100 can include a set of wheel speed sensors, each wheel speed sensor can couple to a corresponding driven wheel of the bogie 130. The controller 150 can then leverage signals output from each wheel speed sensor to track traction between the driven wheels of the bogie 130 and a ground surface and trigger the motor 131 to regeneratively brake the trailer, as further described below.

However, the chassis 132 can be manufactured in any other way and transiently installed on the trailer 140 in any other way.

4.1 Latches

Generally, the set of latches 133 are configured to cooperate with the array of engagement features 144 distributed along the left rail 147 and the right rail 147 in order to retain the bogie 130 below the floor 146 of the trailer 140 over a range of longitudinal positions.

In one implementation, the set of latches 133 are configured to transiently engage a first subset of engagement features 144, in a first array of engagement features 144 on the left rail 147 and in a second array of engagement features 144 on the right rail 147 of the trailer 140, to retain the bogie 130 below a floor 146 of the trailer 140.

More specifically, in this implementation, each latch in the set of latches 133 can include a solenoid (e.g., an electromechanical solenoid, a pneumatic solenoid), or another electrical or mechanical latch (e.g., an air pressure latch, a mechanical lever) configured to transiently engage with a corresponding engagement feature in the array of engagement features 144 distributed along the left rail 147 and the right rail 147 of the trailer 140. Further, each solenoid or other electromechanical latch can be operable in an engaged position (e.g., a closed position) to engage and retain a corresponding engagement feature to couple the bogie 130 to the floor 146 of the trailer 140. In the engaged position, each solenoid or other latch remains engaged with the corresponding engagement feature to prevent slippage of the bogie 130 away from the trailer 140 while the trailer 140 is in motion. Alternatively, each solenoid or other latch can be operable in a disengaged position (e.g., an open position) to disengage from the corresponding engagement feature and decouple the bogie 130 from the floor 146 of the trailer 140 and thereby, enable a user to selectively adjust the position of the bogie 130 and remove or service the bogie 130 (e.g., clean the bogie 130, replace the motor 131, clean the driven wheels) without additional tools.

Additionally, each solenoid or other latch can be actuated by a user input such as a physical key, a manual switch, a manual valve or via wireless communication with a computational device (e.g., a mobile phone, a tablet) of a user (e.g., an operator, a driver, a technician) in order to engage and disengage each solenoid or other electromechanical latch from the corresponding engagement feature on the left rail 147 and the right rail 147, thereby enabling the user to freely guide the bogie 130 along the left rail 147 and the right rail 147 to a target position and/or to remove the bogie 130 for service (e.g., replacement of the left driven wheel or the right driven wheel, replacement of the motor 131). Thus, the set of latches 133 can cooperate with the engagement features 144 of the left rail 147 and the right rail 147 to prevent unauthorized access and/or removal of the bogie 130 from the trailer 140.

However, the bogie 130 can include any other type of latch or solenoid configured to support the longitudinal load of the bogie 130 in an engaged position and to transiently install the bogie 130 to the trailer 140 over a range of longitudinal positions.

4.1.1 Clamp

In one variation, the system 100 can further include a clamp (e.g., a mechanical clamp, a hydraulic clamp, an electromechanical clamp, a locking pin) configured to engage the bogie 130, on a distal end of the trailer 140, to the floor 146 of the trailer 140. The clamp is further configured to prevent slippage of the set of rails 147 along a longitudinal axis 143 of the trailer 140 and thus, the bogie 130 once the set of latches 133 are engaged with corresponding engagement features 144.

For example, a user or a machine may: arrange the bogie 130 below the floor 146 of the trailer 140 to align the set of latches 133 with corresponding engagement features 144 on the left rail 147 and the right rail 147 of the trailer 140. Then, the user may manipulate the bogie 130 along the floor 146 of the trailer 140 via the left rail 147 and the right rail 147 to guide the bogie 130 toward a target position and balance a weight distribution of the trailer 140. Once the user confirms the bogie 130 is in the target position and the set of latches 133 are in the engaged position with the left rail 147 and the right rail 147, the user may arrange the clamp in an engaged position to lock the bogie 130 to the trailer 140 and prevent slippage of the bogie 130 away from the floor 146 of the trailer 140.

Alternatively, once the user confirms the bogie 130 is in the target position and the set of latches 133 are in the engaged position with the left rail 147 and the right rail 147, a controller 150 can trigger an actuator to mechanically actuate the clamp into an engaged position to lock the bogie 130 to the trailer 140 and prevent slippage of the bogie 130 away from the floor 146 of the trailer 140.

Therefore, the clamp can cooperate with the set of latches 133 to engage and retain the bogie 130 below the floor 146 of the trailer 140, prevent slippage of the bogie 130 away from the floor 146 of the trailer 140, and prevent unauthorized access and/or removal of the bogie 130 from the trailer 140.

4.2 Energy Chain

In one variation, as shown in FIG. 1B, the system 100 can further include an energy chain coupled to the trailer chassis, arranged proximal the set of rails 147 of the trailer 140, and configured to enable a user to selectively adjust the longitudinal position of the bogie 130 without additional tools. The energy chain includes: an actuator rider guard (e.g., a chain cable carrier) configured to house a set of power cables and a set of mechanical hanging brackets configured to couple to the battery assembly 120. The actuator rider guard is arranged along the longitudinal axis of the trailer 140, configured to house a set of power cables (e.g., a high-voltage power chain, a low voltage power chain, an anti-lock braking system connection cable), and includes a distal end coupled to the bogie 130.

Additionally, the battery assembly 120 is arranged proximal the bogie 130 and coupled to the bogie 130 via a set of fasteners. The battery assembly can further include a channel and the energy chain is arranged within the channel and coupled to the battery assembly 120 via the set of hanging brackets. The energy chain enables the user to selectively adjust the longitudinal position of the bogie 130 below the trailer chassis 132 without additional tools.

For example, the actuator rider guard is configured to house a first power cable electrically coupled between the battery assembly 120 and the bogie 130 and a second power cable electrically coupled to the tow vehicle. The user may then manually disengage the set of latches of the bogie 130 from corresponding engagement features 144 along the set of rails 147 and selectively adjust the bogie 130, the battery assembly 120, and the energy chain along the set of rails 147 to a target position and thus, guide the first and second power cables within the actuator rider guard. Therefore, the energy chain enables a user to freely guide the bogie 130 over a range of longitudinal positions and prevents damage or collision to the power cables in the system 100.

4.2 Driven Axle+Motor

In one implementation, the driven axle 137 is supported by an axle housing, suspended from the chassis 132, and includes a left driven wheel 138 and a right driven wheel 139. The axle housing further encapsulates a motor 131 mounted to the driven axle 137 and is configured to protect the driven axle 137 and the motor 131 when the bogie 130 is adjusted along the floor 146 of the trailer 140 and/or removed for service. In this implementation, the motor 131 is configured to drive the left driven wheel 138 and the right driven wheel 139 and thus, output torque in a tow mode. The motor 131 is further configured to regeneratively brake the left driven wheel 138 and the right driven wheel 139 to slow motion of the trailer 140 in a regenerative braking mode.

Figure 5A:
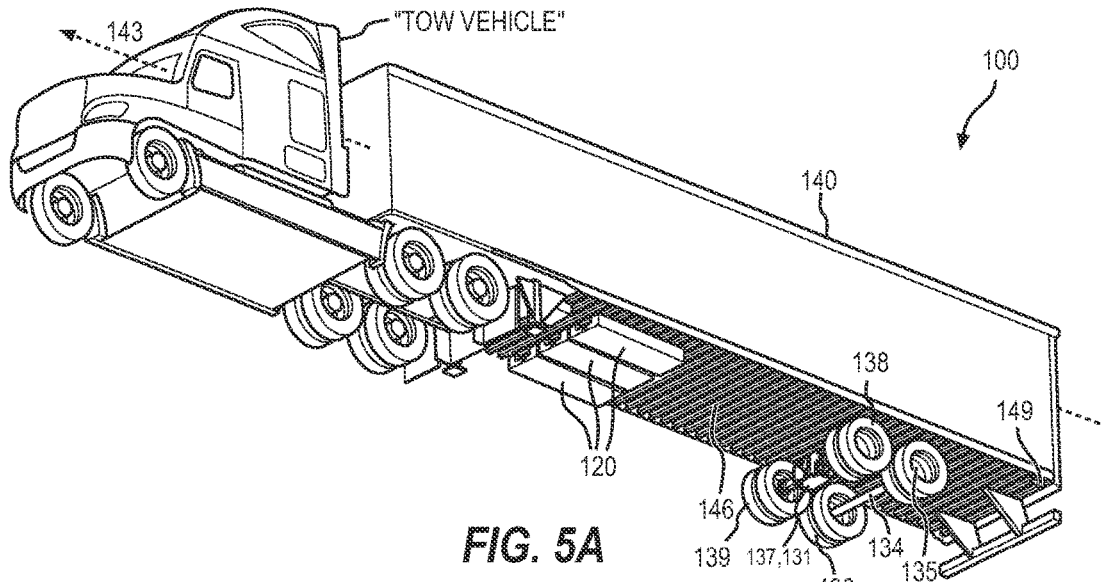
FIGS. 5A, 5B, 5C, and 5D are schematic representations of one variation of the system.

In one variation, shown in FIGURE 5A, the bogie 130 includes a passive axle 134, suspended from the chassis 132, adjacent the driven axle 137 and includes a left passive wheel 135 and a right passive wheel 136. In this variation, the left passive wheel 135 and the right passive wheel 136 are configured to assist motion of a trailer 140 when the left driven wheel 138 and the right driven wheel 139 are driven by the motor 131 in the tow mode.

For example, the bogie 130 can include: a chassis 132; a passive axle suspended from the chassis 132 and including a left passive wheel 135 and a right passive wheel 136; a driven axle 137, adjacent the passive axle, suspended from the chassis 132 and including a left driven wheel 138 and a right driven wheel 139; and a motor 131 coupled to the driven axle 137. In this example, the controller 150 can trigger the motor 131 to output torque to the driven axle 137 to drive the left driven wheel 138 and the right driven wheel 139 and thus, the left passive wheel 135 and the right passive wheel 136 in the tow mode. Alternatively, the controller 150 can trigger the motor 131 to regeneratively brake the left driven wheel 138 and the right driven wheel 139 to slow motion of the trailer 140, and thus the left passive wheel 135 and the right passive wheel 136 in a regenerative braking mode.

In another variation, the bogie 130 can include a set of (e.g., two) driven axles 137 and a passive axle (e.g., a tri-axle). Each driven axle 137 is supported by an axle housing, is suspended from the chassis 132, and includes a left driven wheel 138 and a right driven wheel 139. In this variation, each driven axle 137 is suspended from the chassis 132 on a distal end of a trailer 140. Further, the left passive wheel 135 and the right passive wheel 136 are configured to assist motion of the trailer 140 when the left driven wheel 138 and the right driven wheel 139 of each driven axle 137 are driven by the motor 131 in the tow mode.

In yet another variation, the bogie 130 can include a set of (e.g., two) driven axles 137 and a set of (e.g., two) passive axles (e.g., a quad-axle). Each driven axle 137 is supported by an axle housing, is suspended from the chassis 132, and includes a left driven wheel 138 and a right driven wheel 139. Each passive axle is suspended from the chassis 132, arranged adjacent the set of driven axles 137, and includes a left passive wheel 135 and a right passive wheel 136. In this variation, each left passive wheel 135 and right passive wheel 136 are configured to balance a weight of the trailer 140 in conjunction with the left driven wheel 138 and the right driven wheel 139 of each driven axle 137.

4.3 Pressure Sensors

The system 100 can further include a set of pressure sensors 115 configured to output signals corresponding to air pressure in brake lines of the trailer 140. Each pressure sensor 115 can then transmit these signals to the controller 150.

In one variation, the system 100 can include a pressure sensor 115 configured to output signals corresponding to air pressure of an emergency brake line (e.g., a supply brake line) system of the trailer 140 from an air supply of the tow vehicle and transmit these signals to the controller 150.

In another variation, the system 100 can include a pressure sensor 115 coupled to the driven axle 137 and configured to output signals corresponding to air pressure of air bags in an air-ride suspension system coupled to the driven axle 137 and transmit these signals to the controller 150.

In yet another variation, the system 100 can include a pressure sensor 115 configured to couple to a spring-brake relay and output signals corresponding to air pressures at the spring-brake relay of the trailer 140 from an air supply of the tow vehicle and transmit these signals to the controller 150.

5. Kingpin

The system 100 further includes a kingpin 110 arranged on a proximal end of the trailer 140 opposite the bogie 130 and is configured to interface with a hitch (e.g., a fifth wheel) of a tow vehicle (e.g., a tractor trailer 140, a semitruck, a semi). The kingpin 110 further includes a set of sensors configured to output a signal representing forces applied to the kingpin 110 by the hitch, as shown in FIGS. 6A, 6B, 6C, and 6D.

In one implementation, the kingpin 110 includes: a head 117; a shank 116; a base in; a set of fasteners; a geolocation module; a wireless communications module; and a suite of sensors 119 including force sensors (e.g., a strain gauge, an IMU, a load cell), optical sensors (e.g., a one-dimensional depth sensor, a LIDAR sensor, an RGB camera), and/or inertial sensors (e.g., an IMU, an accelerometer, a gyroscope). The kingpin 110 is further characterized by a unitary steel alloy structure.

In one variation, the kingpin 110 is coupled to a floor 146 of a trailer 140 and is configured to transfer vertical loads from the trailer 140 into a hitch of a tow vehicle. In this variation, the set of sensors 119 are configured to: output signals representing forces applied to the kingpin 110 (e.g., via the force sensors); output signals representing inertial conditions of the trailer 140 (e.g., via the inertial sensors); output signals representing a location of the trailer 140 (e.g., via the geolocation module); and transmit these force data, inertial conditions data, weight distribution data, and/or geolocation data to the integrated controller via the communications module.

5.1 Base+Shank+Force Sensors

In another variation, the base in of the kingpin 110 defines a set of through-bores 114 arranged radially about the shank 116 and configured to receive a set of fasteners to couple the kingpin to a floor 146 of the trailer 140 and thus, fasten (e.g., mount, bolt-in) the kingpin no to the trailer 140. In this variation, the shank 116 of the kingpin 11o defines a first sensor receptacle extending parallel to a lateral axis of the trailer 140; and defines a second sensor receptacle extending parallel to a longitudinal axis 143 of the trailer 140. Further, a first strain gauge is arranged in the first sensor receptacle and is configured to output a signal representing shear forces in the kingpin parallel to the lateral axis and a second strain gauge is arranged in the second sensor receptacle and configured to output the second signal representing shear forces in the kingpin parallel to the longitudinal axis 143.

In another variation, the kingpin 110 can include a set of force sensors 119. In this variation, the kingpin 110 can include: a first sensor 119 configured to output signals representing lateral forces (e.g., loads) applied to the kingpin 110; and a second sensor 119 configured to output signals corresponding to longitudinal forces (e.g., loads), parallel to a longitudinal axis 143 of the trailer 140, applied to the kingpin 110. Each sensor can then transmit these force data to the integrated controller.

6. Controller

Figure 8:
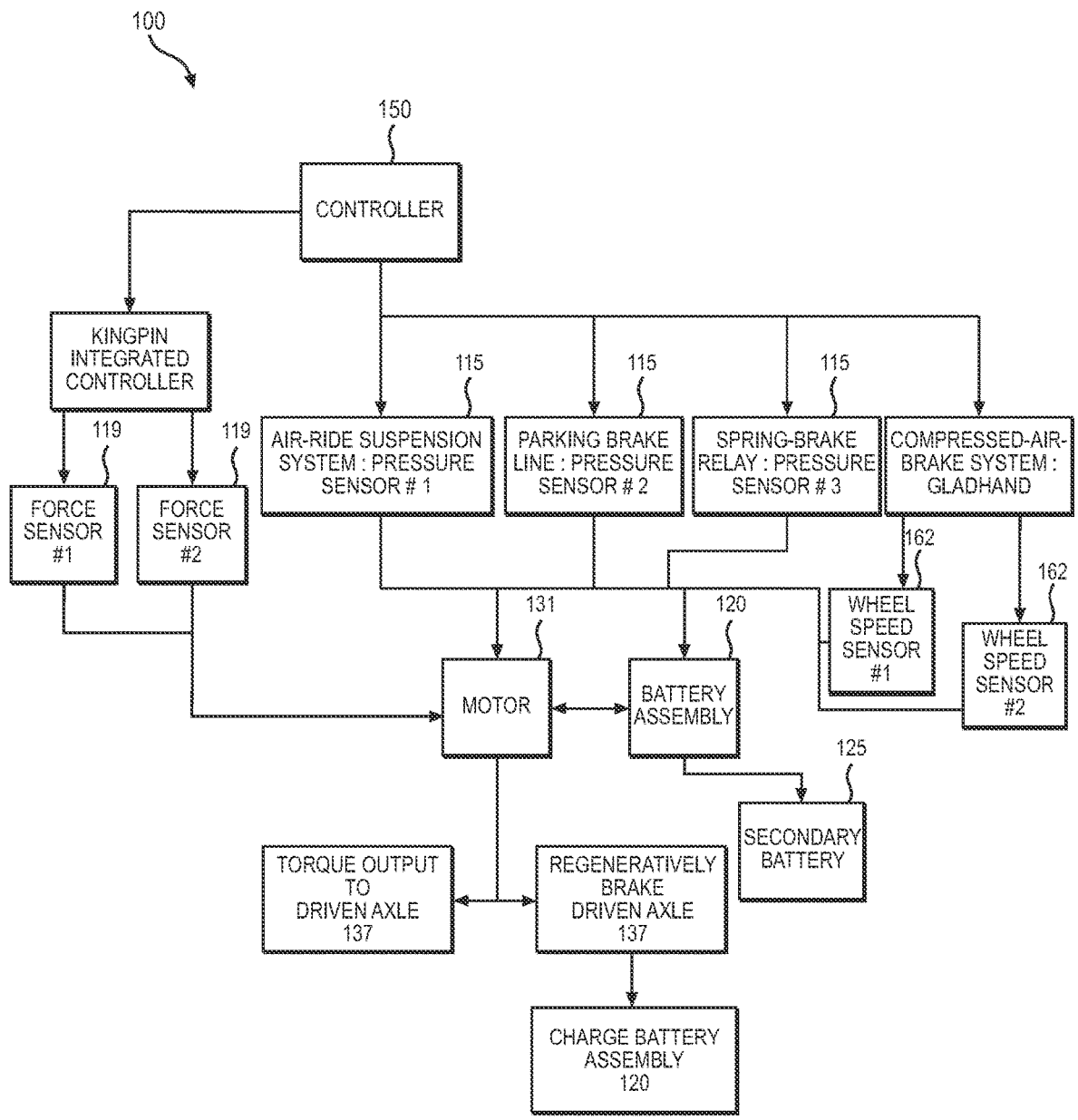
FIG. 8 is a block diagram of one variation of the system.

The controller 150 is coupled to sensors within the system 100, interfaces with the integrated controller of the kingpin no and executes methods and techniques described below to: selectively enter an operational mode (e.g., a tow mode, a regenerative braking mode, a service mode); in a tow mode, selectively operate the motor 131 of the bogie 130 to output torque to the driven axle 137; detect a direction of motion of the trailer 140; access signals output by sensors coupled to an emergency brake line (e.g., a supply brake line, a spring-brake relay), suspension systems, and wheels of the trailer 140; identify errors (e.g., sensor failure, pneumatic or mechanical brake failure of the trailer 140); and, in a regenerative braking mode, trigger the motor 131 to selectively increase or decrease the supply of an electrical energy flux to the battery assembly 120 to regeneratively brake the driven axle 137 and charge the battery assembly 120 based on these signals and identified errors, as shown in FIG. 8.

6.1 Integrated Local Controllers

In one variation, the system 100 includes a primary controller 150 and a set of local controllers. In particular, the bogie 130 can include an integrated local controller configured to interface (e.g., via wireless communication, via wired communication) with the primary controller 150: to selectively operate the motor 131 of the bogie 130 to output torque to the driven axle 137; to trigger the motor 131 to selectively increase or decrease the supply of an electrical energy flux to the battery assembly 120 to regeneratively brake the driven axle 137; and to trigger the motor 131 to selectively reduce torque output and/or increase torque output to decrease a difference between each force and the target preload force. The battery assembly 120 can include an integrated local controller configured to interface with the primary controller 150 to receive an electrical energy flux from the motor 131 to charge the battery assembly 120.

The kingpin 110 can further include an integrated local controller configured to interface with the primary controller 150 in order to: calculate a direction and a magnitude of each force applied to the kingpin 110; identify a coupling and/or a decoupling event between a hitch (e.g., a fifth wheel) of a tow vehicle (e.g., a tractor-trailer) and the kingpin 110 based on these forces; and calculate a target preload force as a function of a condition of the trailer 140 (e.g., a speed, an incline angle, a tractor-trailer angle, a location, a charge state of a battery, a weight distribution) in a tow mode.

7. Battery Assembly

Generally, the system 100 further includes a battery assembly 120 configured to transiently install on the trailer 140 over a range of longitudinal positions and electrically couple to the bogie 130 by a power cable (or integrated directly with the chassis 132 of the bogie 130) in order to supply power to the motor 131.

More specifically, the battery assembly 120 can further supply electrical energy to the motor 131 to output torque to the driven axle 137 in a tow mode and receive electrical energy from the motor 131 to charge the battery assembly 120 in a regenerative braking mode. Further, the battery assembly 120 can include a set of modular batteries configured to engage with each other and fit within a battery frame (e.g., a stressed frame). The battery frame is configured to fit below a standard floor 146 of a trailer 140 between the left rail 147 and the right rail 147 and thus, enable a user to quickly and repeatably install the battery assembly 120 or the set of modular batteries below a standard floor 146 of any trailer 140. The set of modular batteries enables a user to selectively adjust the battery capacity of the battery assembly 120 as a function of a predicted distance traveled by the trailer 140, a weight distribution of the trailer 140, a type of the trailer 140 (e.g., a dry van trailer 140, a refrigerated trailer 140), and/or a length of the trailer 140 (e.g., 20 feet, 40 feet, 48 feet, 53 feet, 60 feet).

In one implementation, the battery assembly 120 includes a set of latches 133 configured to: transiently engage a subset of engagement features 144, in the first array of engagement features 144 on the left rail 147 and in the second array of engagement features 144 on the right rail 147; and to retain the battery assembly 120 below the floor 146 of the trailer 140. In this implementation, each latch in the set of latches 133 can include a solenoid (e.g., an electromechanical solenoid, a pneumatic solenoid), or another electromechanical latch (e.g., an air pressure latch, a mechanical latch) operable in an engaged position and a disengaged position to transiently engage and/or disengage a corresponding engagement feature distributed along the left rail 147 and the right rail 147 of the trailer 140, as described above.

However, each modular battery in the battery assembly 120 can define any other shape and couple to the motor 131 in any other way.

7.1 Modular Battery Assemblies

In one variation, shown in FIGS. 4A and 4B, the battery assembly 120 can include a set of modular batteries characterized by a combined battery capacity associated with a dry van trailer type to supply electrical energy to the motor 131 in a tow mode.

For example, an operator may select a set of (e.g., two) modular battery assemblies 120 characterized by a combined battery capacity within a target capacity range associated with a dry van trailer type to power the motor 131 (e.g., between 100 kilowatt-hours and 400 kilowatt-hours). In this example, the operator or a machine may install the battery frame and a first battery assembly 120, installed in the battery frame, below the floor 146 of the trailer 140 adjacent a proximal end of the bogie 130 (e.g., facing a hitch of a tow vehicle) to engage the set of latches 133 of the first battery assembly 120 with corresponding engagement features 144 on the left rail 147 and the right rail 147 of the dry van trailer 140. Then, the user or the machine may install a second battery assembly 120, installed in the battery frame, below the floor 146 of the trailer 140 proximal a distal end of the bogie 130 opposite the first battery assembly 120 to engage a second set of latches 133 of the second battery assembly 120 with corresponding engagement features 144 on the left rail 147 and the right rail 147 of the dry van trailer 140. Once the controller 150 enters a tow mode, the controller 150 can: trigger the first battery assembly 120 to supply electrical energy via a power cable to the motor 131 of the dry van trailer type; and trigger the second battery assembly 120 to supply electrical energy to the motor 131 to output torque to the driven axle 137 in a tow mode.

In another variation, shown in FIG. 4C, the battery assembly 120 can include a set of (e.g., two) battery assemblies characterized by a combined battery capacity associated with a refrigerated trailer type to supply electrical energy to the motor 131 in a tow mode and to supply electrical energy to a refrigeration system of the trailer 140 to maintain a target temperature of perishable goods stored within the trailer 140 in a tow mode.

For example, the operator may select a set of (e.g., two) battery assemblies 120 characterized by a combined battery capacity within a target capacity range associated with a refrigerated trailer type to power the motor 131 (e.g., between 280 kilowatt-hours and 750 kilowatt-hours) and electrically couple the set of battery assemblies 120 in parallel. Similar to the example above, the user or machine may: install the first battery assembly 120 below the floor 146 of the trailer 140 adjacent a proximal end of the bogie 130 (e.g., facing a hitch of a tow vehicle); electrically couple the first battery assembly 120 to the motor 131 via a first power cable housed in the energy chain; install the second battery assembly 120 below the floor 146 of the trailer 140 proximal a distal end of the bogie 130 opposite the first battery assembly 120; and electrically couple the second battery assembly 120 to a refrigeration system of the trailer 140 via a second power cable. The controller 150 can then trigger the first battery assembly 120 to supply a first electrical energy flux to the motor 131 to output torque to the driven axle 137; trigger the second battery assembly 120 to supply a second electrical energy flux, different from the first electrical energy flux, to the refrigeration system to maintain a target temperature of the trailer 140 in the tow mode; and trigger the motor to supply electrical energy to the first battery assembly and the second battery assembly to charge the first battery assembly and the second battery assembly in the regenerative braking mode.

Alternatively, the operator may select a set of (e.g., two) battery assemblies 120 characterized by a combined battery capacity within a target capacity range associated with a refrigerated trailer type to power the motor 131 (e.g., between 280 kilowatt-hours and 750 kilowatt-hours) and electrically couple the set of battery assemblies 120 in parallel. The controller 150 can then trigger the first battery assembly and the second battery assembly to supply a first electrical load to the motor to output torque to the driven axle 137; trigger the first battery assembly and the second battery assembly to supply a second electrical load, different from the first electrical load, to the refrigeration system to maintain a target temperature of the trailer 140 in the tow mode; and trigger the motor to supply electrical energy to the first battery assembly and the second battery assembly to charge the first battery assembly and the second battery assembly in the regenerative braking mode.

Thus, the system 100 can include additional battery assemblies 120 to supply electrical energy to the refrigeration system of a refrigerated trailer 140 to maintain a temperature of goods (e.g., perishable goods) as the trailer 140 transports these goods from a start location to a termination location.

Therefore, the battery assembly 120 can include a set of modular batteries 120 that enables a user to select a battery assembly 120 characterized by a battery capacity that falls within a target capacity range associated with a particular trailer type (e.g., a dry van trailer 140, a refrigerated trailer 140) and/or to supply electrical energy to additional systems of the trailer 140.

8. Bogie Variations: Individual Motor+Dual Motors

Figure 5B:
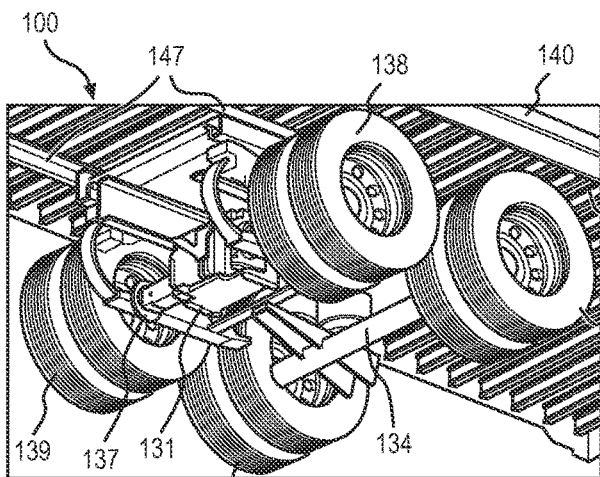
Figure 5C:
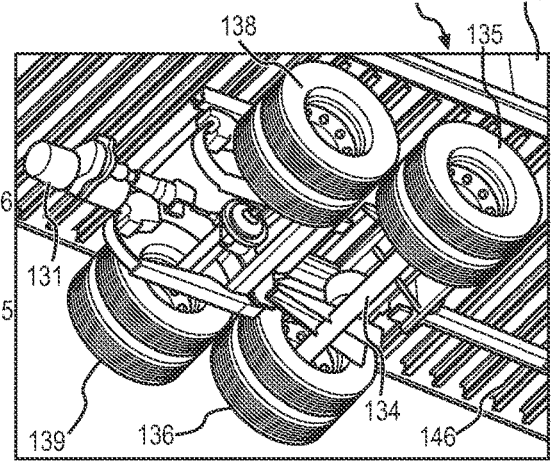

In one variation, shown in FIGS. 5A, 5B, and 5C, the motor 131 is coupled to the driven axle 137 parallel to the longitudinal centerline of the trailer 140. The controller 150 can then: detect a forward motion of the trailer 140 (e.g., via an IMU coupled to the trailer 140 of kingpin); in tow mode, trigger the battery assembly 120 to supply an electrical energy flux to the motor 131 to output torque to the left driven wheel 138 and the right driven wheel 139 in the forward direction of motion; and, in regenerative braking mode, trigger the motor 131 to supply the electrical energy flux to the battery assembly 120 to regeneratively brake the left driven wheel 138 and the right driven wheel 139 in a reverse direction of motion (e.g., opposite the forward direction of motion) to slow motion of the trailer 140.

Figure 5D:
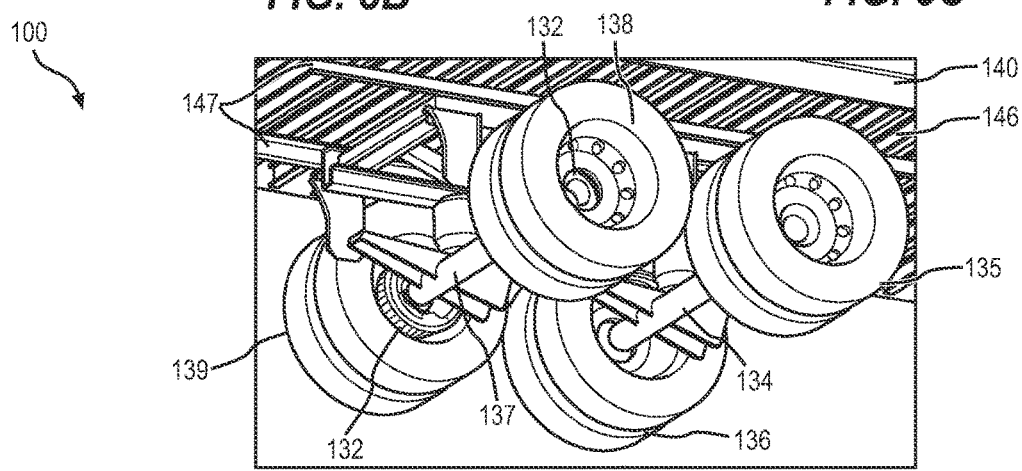
Figure 6A:
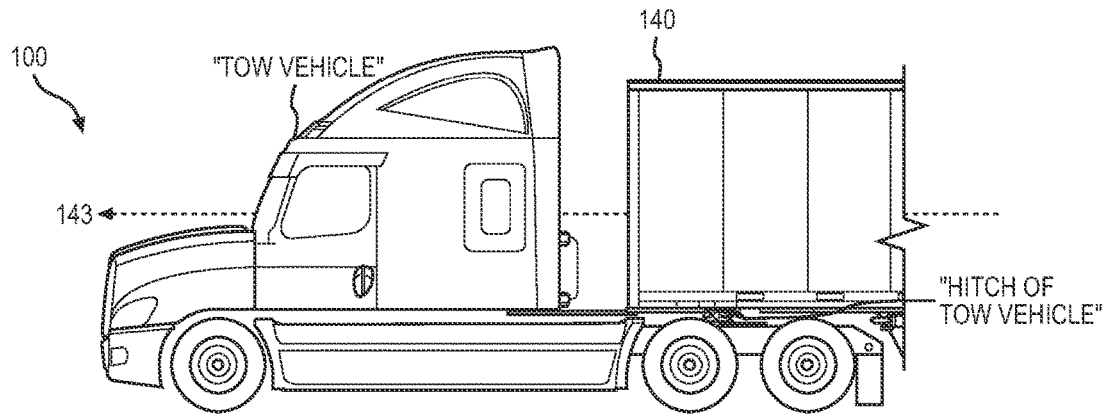
FIGS. 6A, 6B, 6C, and 6D are schematic representations of one variation of the system.
Figure 6B:
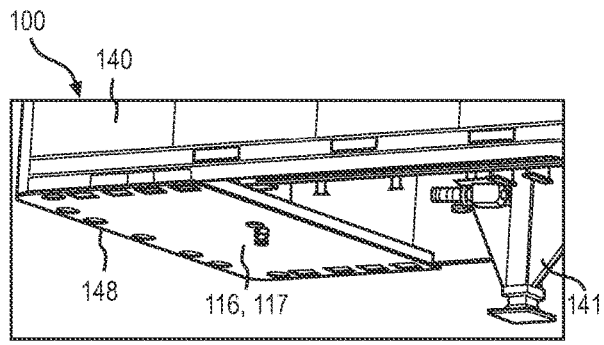
Figure 6C:
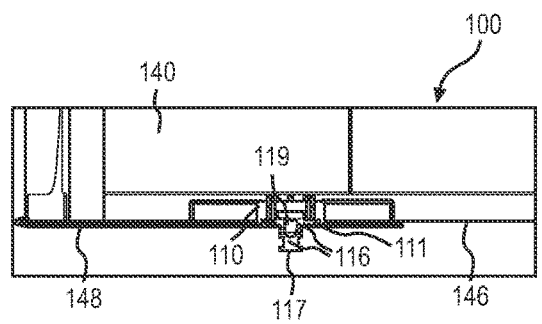
Figure 6D:
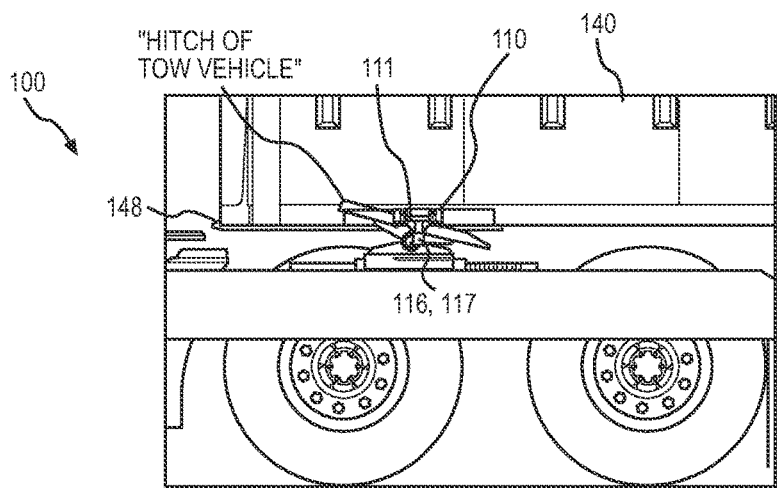
Figure 7:
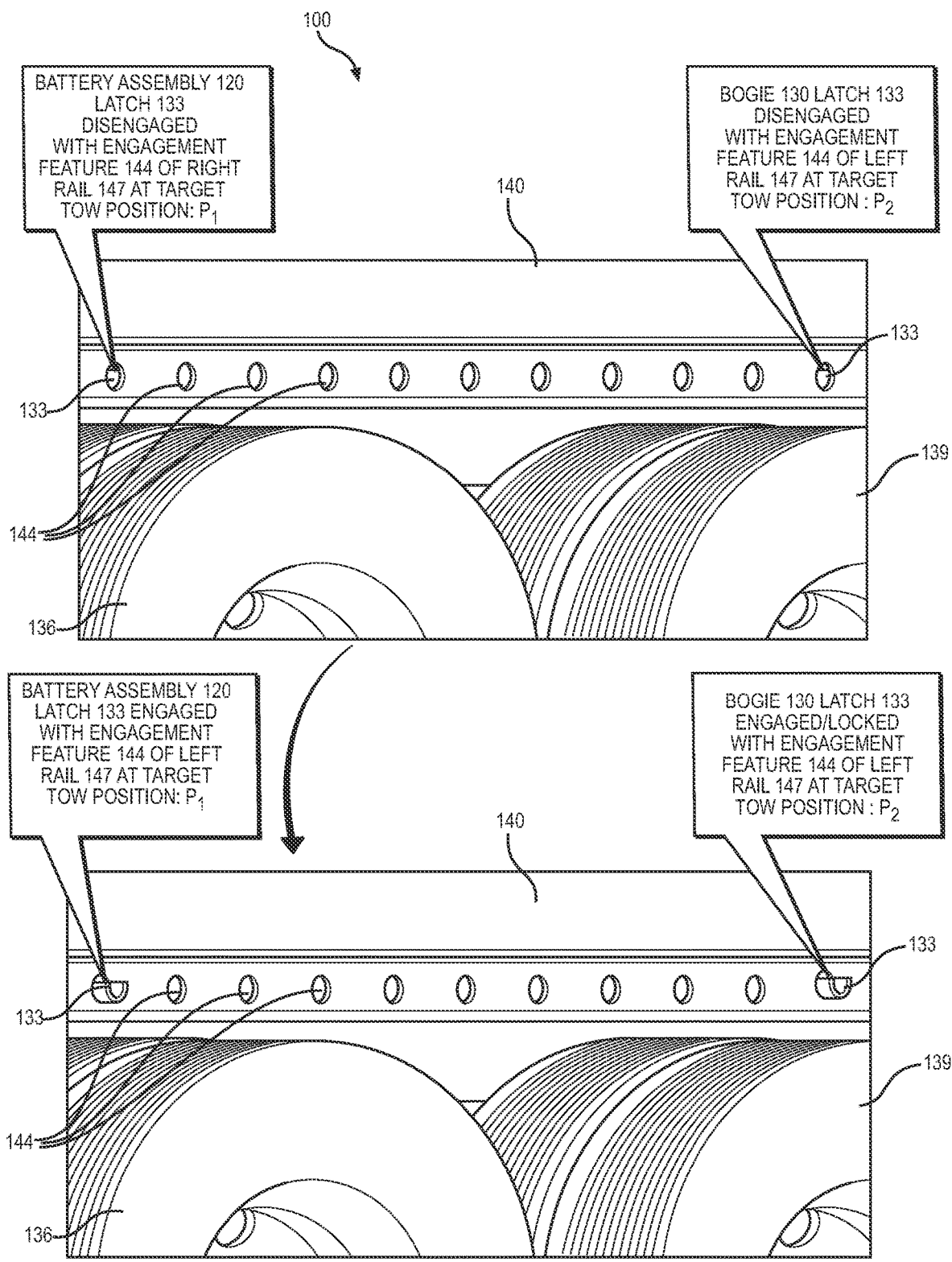
FIG. 7 is a schematic representation of one variation of the system.

In another variation, shown in FIG. 5D, the bogie 130 can include a set of motors coupled to the driven axle 137 and each motor in the set of motors is configured to output torque to a corresponding driven wheel to drive the driven wheel in the direction of motion of the trailer 140 in a tow mode and to regeneratively brake the driven wheel in a regenerative braking mode.

For example, the bogie 130 can include: a left motor coupled to a left side of the driven axle 137 and laterally offset from the longitudinal centerline of the trailer 140; and a right motor coupled to a right side of the driven axle 137 and laterally offset from the longitudinal centerline of the trailer 140 opposite the left motor. The controller 150 can then detect a forward direction of motion of the trailer 140 and in tow mode: trigger the battery assembly 120 to supply a first electrical energy flux to the left motor to output torque to the left driven wheel in the forward direction of motion; and trigger the battery assembly 120 to supply the first electrical energy flux to the right motor 131 to output torque to the right driven wheel in the forward direction of motion. In regenerative braking mode, the controller 150 can: trigger the left motor to supply a second electrical energy flux, different than the first electrical energy flux, to the battery assembly 120 to regeneratively brake the left driven wheel in a reverse direction of motion; and trigger the right motor to supply the second electrical energy flux to the battery assembly 120 to regeneratively brake the right driven wheel in the reverse direction of motion.

Therefore, the controller 150 can trigger an individual motor 131 or a set of motors coupled to the driven axle 137 to output torque to the driven axle 137 or regeneratively brake the driven axle 137, and thus, manipulate the driven wheels of the trailer 140 in a tow mode and in a regenerative braking mode.

9. Tow Mode

Generally, the user (e.g., an operator, a driver, a yard manager) or a machine (e.g., a forklift) couples the hitch (e.g., a fifth wheel) of a tow vehicle to the kingpin 11o and the controller 150 can identify a coupling event between the kingpin 110 (e.g., via a signal from a force sensor) and the hitch of the tow vehicle. In particular, the controller 150 can interface with the integrated controller to: detect an initial force impulse applied to the kingpin; interpret the initial force impulse as a coupling event with the hitch of the tow vehicle; and, in response to interpreting the initial force impulse as the coupling event with the hitch of the tow vehicle, enter a tow mode.

In one implementation, in tow mode, the controller 150 can detect conditions of the trailer 140 such as: a direction of motion of the trailer 140; a tractor-trailer (e.g., a steering angle); a speed of the trailer 140; an incline angle of the trailer 140 (e.g., a grade of a ground surface); a location of the trailer 140; forces applied to the kingpin 110 (e.g., lateral forces, longitudinal forces, vertical forces, total forces); a charge state of the battery assembly 120 coupled to the trailer 140; and/or a weight of the trailer 140 on the driven axle 137. The controller 150 can then: calculate a target preload force proportional to and/or inversely proportional to the condition of the trailer 140; and trigger the motor 131 to increase torque output and/or reduce torque output in the direction of motion of the trailer 140 to decrease a difference between the target preload force and a total force applied to the kingpin (e.g., an actual force) to control the trailer 140 in conjunction with the tow vehicle.

More specifically, during a given time period (e.g., thirty seconds, five minutes, ten minutes, one hour), the controller 150 can interface with the integrated controller of the kingpin 110 to: detect a direction of motion of the trailer 140; detect a weight distribution (e.g., a load on each axle) of the trailer 140; and set a target preload force opposite the direction of motion based on the weight distribution; detect a speed of the trailer 140; and, in response to the speed exceeding a lower speed limit (e.g., 20 miles per hour, 30 miles per hour) enable torque output and regenerative braking at the motor 131. Then, the controller 150 can: calculate a speed variance over the time window based on the speed of the trailer 140; adjust target torque output inversely proportional to the speed variance; and adjust the target preload force proportional to the speed variance. The controller 150 can further: detect a location of the trailer 140; retrieve a georeferenced location or a low-emissions region from a drive route assigned to the trailer 140; and, in response to the location falling within the threshold distance of the low-emissions region, increase target torque output and decrease the target preload force. Alternatively, in response to the location falling outside of a threshold distance of the low-emissions region, the controller 150 can decrease target torque output and increase the target preload force.

Additionally, the controller 150 can: detect an incline angle of the trailer 140; adjust target torque output proportional to the incline angle of the trailer 140; and adjust target preload force inversely proportional to the incline angle of the trailer 140. Similarly, the controller 150 can: detect a decline angle of the trailer 140; adjust target torque output inversely proportional to the decline angle of the trailer 140; and adjust the target preload force inversely proportional to the decline angle. The controller 150 can: detect a charge state of a battery assembly 120 coupled to the trailer 140; adjust target torque output proportional to the charge state of the battery assembly 120; adjust target regenerative braking inversely proportional to the charge state of the battery assembly 120; and adjust the target preload force inversely proportional to the charge state of the battery assembly 120.

Furthermore, the controller 150 can: detect a longitudinal force applied to the kingpin by a hitch of a tow vehicle (e.g., via a first strain gauge); detect a lateral force applied to the kingpin by the hitch (e.g., via a second strain gauge); calculate a tractor-trailer angle (e.g., a steering angle) based on the longitudinal force and the lateral force; adjust target torque output inversely proportional to the tractor-trailer angle; and adjust the target preload force proportional to the tractor-trailer angle. The controller 150 can then: calculate a total force applied to the kingpin 110 by the hitch based on the lateral force and the longitudinal force. Accordingly, in response to the total force exceeding the target preload force, the controller 150 can trigger a motor 131, arranged in the bogie 130 to increase torque output in the direction of motion of the trailer 140 to decrease a difference between the target preload force and a total force applied to the kingpin (e.g., an actual force) to control the trailer 140 in conjunction with the tow vehicle. Alternatively, in response to the total force falling below the target preload force, the controller 150 can trigger the motor 131 to reduce torque output in the direction of motion of the trailer 140 to decrease a difference between the target preload force and the total force applied to the kingpin (e.g., an actual force) to control the trailer 140 in conjunction with the tow vehicle.

Therefore, the controller 150 can leverage the dynamic target preload force, torque output, and regenerative braking: to prevent a jackknife event between the tow vehicle and the trailer 140 (e.g., tow vehicle brakes to a stop and the trailer 140 continues to move toward and push the tow vehicle or torque applied to the kingpin); to reduce emissions by the tow vehicle; to decrease fuel consumption by the tow vehicle; to extend the life of each battery assembly 120 coupled to the trailer 140; and to enable a driver of the tow vehicle to apply minimal to no brake force via the mechanical or pneumatic braking system to the trailer 140 in tow mode.

9.1 Dynamic Target Preload Force: Tractor-Trailer Angle

In one implementation, the controller 150 can detect a direction of motion and a speed of the trailer 140, detect a lateral force and a longitudinal force applied to the kingpin by the hitch, and calculate a tractor-trailer as conditions of the trailer 140. The controller 150 can leverage these conditions to selectively increase, decrease, or disable torque output and adjust the target preload force.

For example, the controller 150 can: detect a first longitudinal force applied to a kingpin, arranged on a proximal end of a trailer 140, by a hitch of a tow vehicle (e.g., via a first strain gauge); detect a first lateral force applied to the kingpin by the hitch (e.g., via a second strain gauge); detect a first speed and a first direction of motion of the trailer 140 (e.g., 30 miles per hour in forward direction via an inertial measurement unit); calculate a first tractor-trailer, between longitudinal axes of the trailer 140 and the tow vehicle, based on the first longitudinal force and the first lateral force; calculate a first total force, applied to the kingpin by the hitch, based on the first longitudinal force and the first lateral force; calculate a first target preload force opposite the first direction of motion (e.g., reverse direction) and proportional to the first tractor-trailer angle; trigger a motor 131, arranged in the bogie 130 located proximal a distal end of the trailer 140, to reduce torque output in the first direction of motion (e.g., forward direction) in order to decrease a first difference between the first total force and the first target preload force, in response to the first speed of the trailer 140 (e.g., 30 miles per hour) exceeding a first threshold speed (e.g., a lower speed limit of 20 miles per hour) and in response to the first total force falling below the first target preload force.

During a second time period, the controller 150 can: detect a second longitudinal force applied to the kingpin by the hitch; detect a second lateral force applied to the kingpin by the hitch; detect a second speed and a second direction (e.g., forward direction) of the trailer 140 (e.g., via an inertial measurement unit); calculate a second total force applied to the kingpin by the hitch based on the second longitudinal force and the second lateral force; calculate a second target preload force opposite the second direction of motion (e.g., a reverse direction) and proportional to the second tractor-trailer angle; and trigger the motor 131 to increase torque output in the second direction of motion (e.g., forward direction) to decrease a second difference between the second total force and the second target preload force, in response to the second speed exceeding the first threshold speed (e.g., 30 miles per hour) and in response to the second total force exceeding the second target preload force.

During a third time period, the controller 150 can: detect a third longitudinal force applied to the kingpin by the hitch; detect a third lateral force applied to the kingpin by the hitch; detect a third speed and a third direction of motion of the trailer 140 (e.g., a forward direction); calculate a third total force applied to the kingpin by the hitch of the tow vehicle based on the third longitudinal force and the third lateral force; and, in response to the third speed of the trailer 140 falling below a second threshold speed (e.g., 50 miles per hour), triggering the motor 131 to disable torque output in the third direction of motion. During a fourth time period, the controller 150 can: detect a fourth longitudinal force applied to the kingpin by the hitch; detect a fourth lateral force applied to the kingpin by the hitch; detect a fourth speed and a fourth direction of motion of the trailer 140 (e.g., 20 miles per hour in forward direction); in response to the fourth speed of the trailer 140 falling below the lower speed limit (e.g., 25 miles per hour), accessing a nominal low-speed preload force; calculating a fourth total force applied to the kingpin by the hitch based on the fourth longitudinal force and the fourth lateral force; and, in response to the fourth total force exceeding the nominal low-speed preload force, trigger the motor 131 to increase torque output in the fourth direction of motion (e.g., forward direction) of the tow vehicle to decrease a third difference between the fourth total force and the nominal low-speed preload force.

9.1.1 Dynamic Target Preload Force: Speed Variance+Duration

In one variation, the controller 150 can calculate a speed variance for the first time period and for the second time period and leverage the tractor-trailers, in the aforementioned example, and these speed variances to calculate the target preload force.

For example, the controller 150 can: calculate a first speed variance of the trailer 140 during the first time period based on the first speed; calculate the first target preload force proportional to the first tractor-trailer angle and proportional to the first speed variance; calculate the second tractor-trailer angle less than the first tractor-trailer angle; calculate a second speed variance of the trailer 140 during the second time period based on the second speed, the second speed variance greater than the first speed variance; and calculate the second target preload force, approximating the first target preload force, proportional to the second tractor-trailer angle and proportional to the second speed variance.

In another variation, the controller 150 can calculate a duration of the trailer 140 exhibiting the first speed during the first time period and exhibiting the first speed during a next time period. The controller 150 can then calculate the target preload force inversely proportional to these durations for the corresponding time period.

For example, the controller 150 can detect a first speed and a first direction of motion of the trailer 140 (e.g., 30 miles per hour in forward direction via an inertial measurement unit) and detect a first total force applied to the kingpin by the hitch during a first time period. The controller 150 can then: detect a first duration of the trailer 140 exhibiting the first speed; and calculate a first target preload force opposite the direction of motion of the tow vehicle and inversely proportional the first duration. During a second time period, the controller 150 can: detect a second speed of the trailer 140 corresponding to the first speed of the trailer 140; detect a second duration of the trailer 140 exhibiting the second speed; and, in response to the second duration exceeding the first duration, calculate a second target preload force, less than the first target preload force, opposite the direction of motion and inversely proportional the second duration. The controller 150 can then trigger the motor 131 to reduce torque output in the first direction of motion (e.g., forward direction) to decrease a first difference between the first total force and the first target preload force in response to the first total force falling below the first target preload force.

Therefore, the controller 150 can leverage the target preload force at the kingpin 110 to control the trailer 140 as the speed of the trailer 140 and a duration of the speed fluctuates during a drive route and thereby, enable a user (e.g., a driver) of the tow vehicle to apply minimal to no assistance to the trailer 140.

9.1.2 Dynamic Target Preload Force: Stiction+Regenerative Braking

In one variation, the controller 150 can detect a difference between the first total force and a second total force (e.g., a force impulse) for a duration of time while the trailer 140 is in motion. The controller 150 can then leverage the speed of the trailer 140, a threshold difference, and a threshold duration of time to identify a stiction event between the kingpin 110 and the hitch of the tow vehicle.

For example, the controller 150 can, during a first time period: detect a first total force applied to the kingpin 110 by the hitch of the tow vehicle; detect a speed and a direction of motion of the trailer 140 (e.g., 30 miles per hour in forward direction via an inertial measurement unit); based on the total force, calculate a tractor-trailer angle, between longitudinal axes of the trailer 140; calculate a target preload force opposite the first direction of motion (e.g., reverse direction) and proportional to the first tractor-trailer angle; trigger the motor 131 to reduce torque output in the direction of motion (e.g., forward direction) in order to decrease a difference between the total force and the target preload force, in response to the speed of the trailer 140 (e.g., 30 miles per hour) exceeding a threshold speed (e.g., a lower speed limit of 25 miles per hour) and in response to the total force falling below the target preload force.

During a second period of time, the controller 150 can: detect a second total force applied to the kingpin 110 by the hitch of the tow vehicle; detect a speed and a direction of motion of the trailer 140 (e.g., 30 miles per hour in forward direction via an inertial measurement unit); detect a difference between the first total force and the second total force for a duration of time (e.g., 5 minutes); and, in response to the difference exceeding a threshold difference and in response to the duration exceeding a threshold duration of time, identify a stiction event between the kingpin 110 and the hitch of the tow vehicle and trigger the motor 131 to regeneratively brake the trailer 140. The controller 150 can then detect a third total force applied to the kingpin 110; and trigger the motor 131 to increase torque output in the direction of motion (e.g., forward direction) to decrease a difference between the third total force and the target preload force in response to the third total force exceeding the target preload force.

Therefore, the controller 150 can monitor forces applied to the kingpin 11o to identify a stiction event between the kingpin 110 and the hitch of the tow vehicle and trigger the motor 131 to selectively apply a regenerative braking force to slow motion of the trailer 140.

9.2 Dynamic Target Preload Force: Incline Angle of Trailer

In one implementation, the controller 150 can detect an incline angle of the trailer 140 representing a grade of the road (e.g., 5% grade, 10% grade) as a condition of the trailer 140 and then leverage the incline angle to selectively adjust the target preload force. Additionally, in response to the incline angle exceeding a threshold incline angle (e.g., trailer 140 is moving up a hill), the controller 150 can decrease the target preload force. Alternatively, in response to the incline angle falling below the threshold incline angle (e.g., trailer 140 is moving down a hill), the controller 150 can increase the target preload force.

For example, during a first time period, the controller 150 can: detect a first longitudinal force applied to the kingpin no by the hitch; detect a first lateral force applied to the kingpin by the hitch of the tow vehicle; detect a first direction of motion of the trailer 140 (e.g., a forward direction); detect a first incline angle of the trailer 140 (e.g., 2.86 degrees); calculate a first total force, applied to the kingpin by the hitch of the tow vehicle, based on the first longitudinal force and the first lateral force; calculate a first target preload force opposite the first direction of motion (e.g., a reverse direction) and proportional to the first incline angle; and, in response to the first total force falling below the first target preload force, trigger the motor 131 to reduce torque output in the first direction of motion (e.g., forward direction) in order to decrease a first difference between the first total force and the first target preload force.

During a second time period, the controller 150 can: detect a second force applied to the kingpin by the hitch of the tow vehicle; detect a decline angle of the trailer 140 (e.g., −0.573 degrees); calculate a second target preload force opposite the direction of motion of the tow vehicle and inversely proportional to the decline angle; and, in response to the second force falling below the second target preload force, trigger the motor 131 to increase torque output opposite the direction of motion (e.g., reverse direction) in order to decrease the second difference between the second force and the second target preload force.

Alternatively, the controller 150 can: calculate a second total force applied to the kingpin by the hitch of the tow vehicle based on the second longitudinal force and the second lateral force; calculate a second target preload force opposite the second direction of motion and proportional the decline angle of the trailer 140; and, in response to the second total force exceeding the second target preload force, trigger the motor 131 to regeneratively brake a driven axle 137 to slow motion of the trailer 140 and to decrease a second difference between the second total force and the second target preload force.

Therefore, the controller 150 can leverage the target preload force at the kingpin 110 to control the trailer 140 as the incline angle of the trailer 140 fluctuates as the trailer 140 navigates road grades during a drive route and thereby, reduce emissions and fuel consumption by the tow vehicle.

9.3 Dynamic Target Preload Force: Drive Route+Location of Trailer

In one variation, the controller 150 can detect a location of the trailer 140 as a condition of the trailer 140 and then leverage the location and a drive route assigned to the trailer 140 to selectively increase or decrease the target preload force.

Furthermore, an operator may define a start location and an end location for a drive route and upload this drive route to a user portal. The controller 150 can then: access the drive route; estimate a set of legs between the start location and the end location for the drive route; and populate each leg of the drive route with a time window, a corresponding georeferenced location, and emission conditions associated with the georeferenced location (e.g., a low-emissions region). The computer system can then access this drive route at the start of the tow mode. The controller 150 can also access signals from a gyroscope or an inertial sensor to detect locations of the trailer 140 during the drive route.

For example, during a first time period, the controller 150 can: detect a first longitudinal force applied to the kingpin 110 by the hitch of the tow vehicle; detect a first lateral force applied to the kingpin by the hitch; detect a first direction of motion and first speed of the trailer 140 (e.g., a forward direction); detect a first tractor-trailer; calculate a first total force, applied to the kingpin by the hitch, based on the first longitudinal force and the first lateral force; calculate a first target preload force opposite the first direction of motion (e.g., a reverse direction) and proportional the tractor-trailer; and, in response to the first total force falling below the first target preload force, trigger the motor 131 to reduce torque output in the first direction of motion (e.g., forward direction) in order to decrease a first difference between the first total force and the first target preload force.

During a second time period, the controller 150 can: detect a second longitudinal force applied to the kingpin 110 by the hitch of the tow vehicle; detect a second lateral force applied to the kingpin by the hitch; detect a second direction of motion and a second speed of the trailer 140 (e.g., a forward direction); detect a second tractor-trailer; retrieve a first low-emissions region from a drive route assigned to the trailer 140; detect a first location of the trailer 140 (e.g., via an inertial measurement unit); calculate a second total force, applied to the kingpin by the hitch, based on the second longitudinal force and the second lateral force; calculate a second target preload force opposite the second direction of motion (e.g., a reverse direction) and proportional to the second tractor-trailer; and, in response to the first location falling within the threshold distance of the low-emissions region and in response to the second speed exceeding the first threshold speed (e.g., 25 miles per hour) and in response to the second total force exceeding the target preload force, trigger the motor 131 to reduce torque output in the second direction of motion (e.g., forward direction) in order to decrease a second difference between the first total force and the first target preload force.

During a third time period, the controller 150 can: detect a third speed and a third direction of motion of the trailer 140 (e.g., forward direction); retrieve a last georeferenced location (e.g., a storage yard) from the drive route assigned to the trailer 140; detect a second location of the trailer 140; and, in response to the third speed of the trailer 140 falling below the first threshold speed and in response to the second location of the trailer 140 falling within the threshold distance of the last georeferenced location (e.g., a storage yard), trigger the motor 131 to disable torque output in the third direction of motion (e.g., forward direction).

Therefore, the controller 150 can selectively increase or decrease the target preload force and the target torque output by the motor 131 as the location of the trailer 140 fluctuates during the drive route. Additionally, the controller 150 can also leverage the target preload force and the location of the trailer 140 to enable a user (e.g., a driver) of the tow vehicle to apply minimal to no brakes to the trailer 140.

9.4 Dynamic Target Preload Force: Charge State of Battery

In one variation, the controller 150 can detect a "real-time" battery status (or a "charge state") of each battery in the battery assembly 120 coupled to the trailer 140. The controller 150 can then detect a charge state of the battery assembly 120 (e.g., a numerical value, a percentage, a level) as a condition of the trailer 140 and leverage this charge state of the battery assembly 120 to selectively adjust the target preload force.

For example, during a first time period, the controller 150 can: detect a first longitudinal force applied to the kingpin 110 by the hitch of the tow vehicle; detect a first lateral force applied to the kingpin by the hitch; detect a first direction of motion and a first speed of the trailer 140 (e.g., a forward direction); detect a first charge state of the battery assembly 120 (e.g., 55%); detect a first tractor-trailer angle; calculate a first total force, applied to the kingpin by the hitch, based on the first longitudinal force and the first lateral force; calculate a first target preload force opposite the first direction of motion (e.g., a reverse direction) proportional to the tractor-trailer angle and inversely proportional to the first charge state of the battery assembly 120; and, in response to the first total force falling below the first target preload force, trigger the motor 131 to reduce torque output in the first direction of motion (e.g., forward direction) to decrease a first difference between the first total force and the first target preload force.

During a second time period, the controller 150 can: detect a second longitudinal force applied to the kingpin 110 by the hitch of the tow vehicle; detect a second lateral force applied to the kingpin by the hitch; detect a second direction of motion and a second speed of the trailer 140 (e.g., a forward direction); detect a second tractor-trailer angle less than the first tractor-trailer angle; detect a second charge state of the battery assembly 120 (e.g., 75%) greater than the first charge state of the battery assembly 120 (e.g., 55%); calculate a second total force, applied to the kingpin by the hitch, based on the second longitudinal force and the second lateral force; calculate a second target preload force opposite the second direction of motion (e.g., a reverse direction) proportional to the second tractor-trailer angle and inversely proportional to the second charge state of the battery assembly 120 (e.g., 75%); and, in response to the second total force exceeding the target preload force, trigger the motor 131 to reduce torque output in the second direction of motion (e.g., forward direction) to decrease a second difference between the first total force and the first target preload force.

Additionally or alternatively, the controller 150 can access the drive route assigned to the trailer 140 and predict a charge state of the battery assembly 120 at the start of the tow mode. Then for each leg of the drive route, the controller 150 can autonomously increase or decrease the target preload force at the kingpin 110 proportional the predicted charge state of the battery assembly 120 associated with each leg of the drive route.

Therefore, the controller 150 can leverage a "real-time" charge state or a predicted charge state of the battery assembly 120 to selectively increase or decrease the target preload force and thereby, increase the life of the battery assembly 120 and reduce emissions by the tow vehicle.

10. Regenerative Braking Mode

Figure 2:
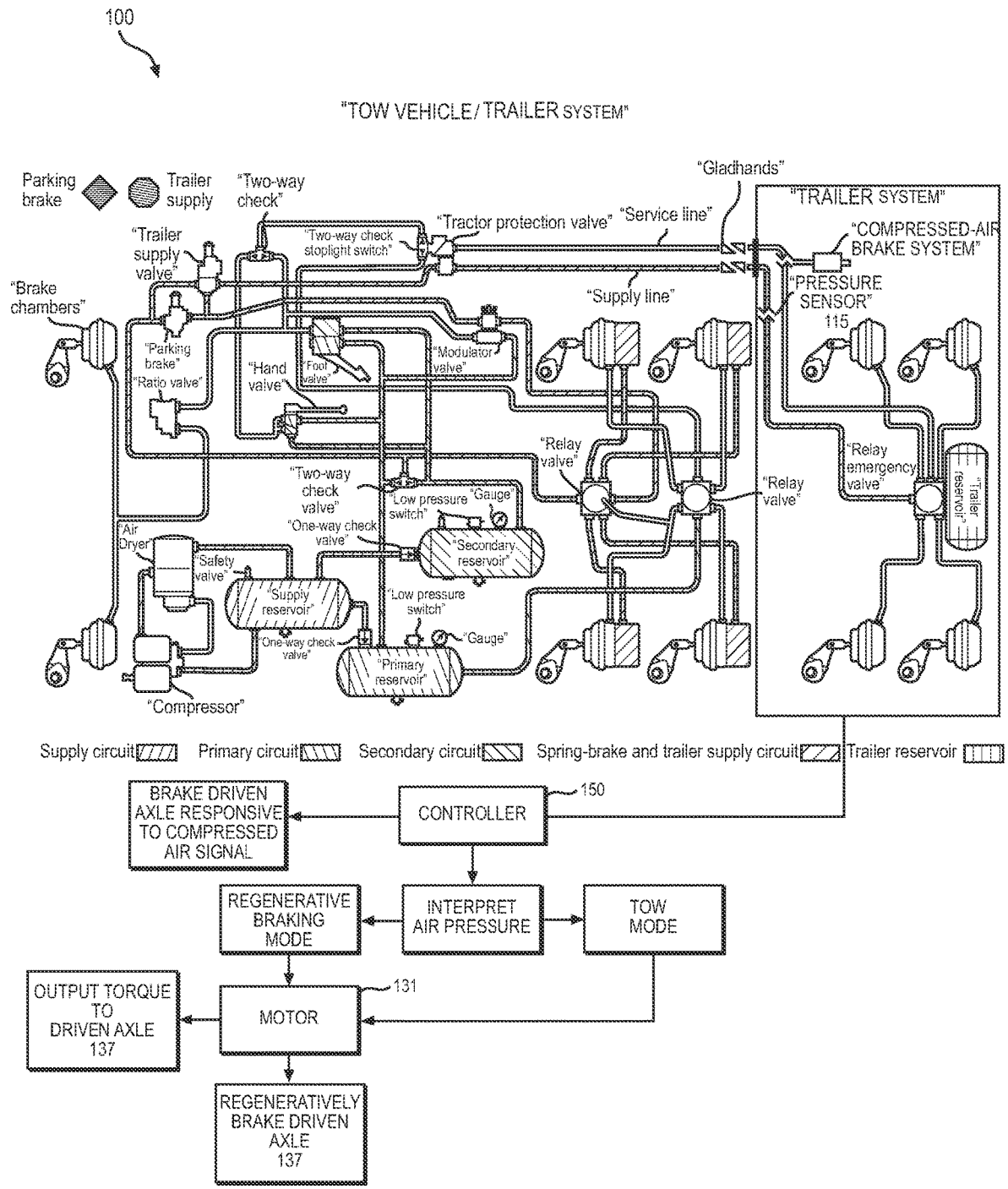
FIG. 2 is a block diagram of one variation of the system.

In one variation, as shown in FIG. 2, the controller 150 can leverage signals output by a pressure sensor 115 coupled to a spring-brake relay of a tow vehicle to automatically transition from the tow mode to the regenerative braking mode and vice versa. Further, in response to the air pressure exceeding a threshold air pressure, the controller 150 can maintain the tow mode and trigger the battery assembly 120 to supply electrical energy to the motor 131 to output torque to the driven axle 137. Alternatively, in response to the air pressure falling below the threshold air pressure, the controller 150 can: identify the air pressure from the tow vehicle as braking from the pneumatic or mechanical system; and trigger the motor 131 to supply electrical energy to the battery assembly 120 to regeneratively brake the driven axle 137 and charge the battery assembly 120.

For example, the system 100 can include a pressure sensor 115 coupled to a spring-brake relay of a tow vehicle and configured to output signals corresponding to air pressures at the spring brake-relay from an air supply of the tow vehicle. At a first time, the controller 150 can then: access a first signal from the pressure sensor 115; interpret a first air pressure at the spring-brake relay based on the first signal; identify absence of braking from the pneumatic or mechanical system and, in the tow mode, trigger the battery assembly 120 to supply electrical energy to the motor 131 to output torque to the driven axle 137. At a second time, the controller 150 can: access a second signal from the pressure sensor 115; interpret a second air pressure at the spring-brake relay based on the second signal; detect a difference between the first air pressure and the second air pressure; and, in response to detecting the difference falling below a threshold pressure difference, enter a regenerative braking mode.

Additionally, in the regenerative braking mode, the system 100 can leverage signals from a pressure sensor 115 coupled to the emergency brake line (e.g., a supply brake line) of the trailer 140 to enter a maximum regenerative braking mode. In particular, in response to an air pressure in the emergency brake line exceeding a threshold air pressure, the controller 150 can: identify absence of braking from the pneumatic or mechanical system for the emergency brake line; and enter a maximum regenerative braking mode.

For example, the system 100 can further include a pressure sensor 115 configured to output signals corresponding to air pressure of a emergency brake line at the trailer 140 from a tow vehicle. Then, the controller 150 can: access a first signal from the pressure sensor 115; interpret a first air pressure of the emergency brake line of the trailer 140 based on the first signal; and, in response to the first air pressure exceeding a threshold air pressure, identify absence of braking from the pneumatic or mechanical system for the emergency brake line and enter a maximum regenerative braking mode. Then, in the maximum regenerative braking mode, the controller 150 can trigger the motor 131 to supply a maximum electrical energy flux to the first battery assembly 120 to regeneratively brake the driven axle 137 and charge the battery assembly 120.

Therefore, the controller 150 can leverage signals output by pressure sensors 115 to automatically transition between the tow mode and the regenerative braking mode.

10.1 Variation: Mechanical Braking vs. Regenerative Braking

In one variation, the controller 150 can detect a charge state of the battery assembly 120 (e.g., a numerical value, a percentage, a level, a capacity) as a condition of the trailer 140 and leverage this charge state of the battery assembly 120 to selectively adjust the ratio of mechanical braking and regenerative braking force output by the motor 131 in regenerative braking mode. Further, the controller 150 can leverage a proportion of the capacity of the battery assembly 120 to power an emergency braking system (e.g., an anti-lock braking system) of the trailer 140 in the regenerative braking mode and thus, prevent a lockup event at the wheels of the trailer 140.

For example, the controller 150 can: access a capacity of the battery (e.g., 100%); calculate a minimum capacity of the battery to power the emergency brake system of the trailer 140 in the regenerative braking mode (e.g., 10%); define a threshold charge state (e.g., 50%) for the battery in regenerative braking mode based on a remaining proportion of the capacity (e.g., 90%); and leverage the threshold charge state to increase or decrease regenerative braking by the motor 131 to the driven axle 137 in regenerative braking mode. Thus, the controller 150 can implement methods and techniques described below to detect absence of a braking force from a pneumatic or mechanical brake system of the tow vehicle, identify a brake failure at the pneumatic or mechanical brake system, and leverage the minimum capacity of the battery to power the emergency brake system of the trailer 140 to slow motion of the trailer 140.

In one implementation, the controller 150 can detect a direction of motion of the trailer 140, implement methods and techniques described above to track the charge state of the battery, and selectively increase or decrease the regenerative braking force output by the motor 131 as a function of the charge state of the battery. For example, the controller 150 can: detect a forward direction of motion of the trailer 140; detect a charge state of the battery; and, in response to the charge state falling below a threshold charge state, trigger the motor 131 to increase a regenerative braking force, opposite the direction of motion, to the driven axle 137. Alternatively, the controller 150 can: detect a charge state of the battery; and, in response to the charge state of the battery exceeding the threshold charge state, trigger the motor 131 to reduce the regenerative braking force, opposite the direction of motion, to the driven axle 137.

10.2 Variation: Compressed-Air-Brake System+Traction

In one variation, as shown in FIG. 2, the bogie 130 can further include a compressed-air-brake system configured to couple to a gladhand of a brake line from a tow vehicle coupled to the trailer 140 and brake the driven axle 137 responsive to air signals received from the tow vehicle via the gladhand. Further, the system 100 can include a set of wheel speed sensors. Each wheel speed sensor can couple to a corresponding driven wheel of the bogie 130 and the controller 150 can leverage signals output from each wheel speed sensor to track traction between the driven wheels of the bogie 130 and a ground surface and trigger the motor 131 to regeneratively brake the trailer. Alternatively, the controller 150 can access signals output from sensors coupled to an anti-lock braking system of the tow vehicle to automatically trigger the motor 131 to apply a braking force to the driven axle 137 via the pneumatic or mechanical brake system of the trailer 140 and/or via regenerative braking.

For example, a user (e.g., a technician, an operator) may manually couple an emergency brake line (e.g., a supply brake line) and a service brake line (e.g., a control brake line) of the trailer 140 to a compressed air supply line of a tractor via a set of hose couplings (e.g., a gladhand coupler, a gladhand connector). The user may then couple a compressed-air-brake system of the bogie 130 to the gladhand coupling between the tractor and the trailer 140. Then, in response to detecting an air signal from the tractor via the gladhand at the compressed-air-brake system, the controller 150 can selectively brake the driven axle 137 via the pneumatic or mechanical brake system of the trailer 140. The controller 150 can further implement methods and techniques described below to enter a regenerative braking mode and alternate the proportion of braking between the pneumatic or mechanical brake system of the trailer 140 and regenerative braking.

In one implementation, the controller 150 can further leverage signals output from each wheel speed sensor to track a level of traction of the left driven wheel 138 and the right driven wheel 139 with a ground surface below the trailer 140 and selectively increase or decrease regenerative braking of the left driven wheel 138 and the right driven wheel 139 based on the level of traction.

For example, the controller 150 can: access an air signal from the tow vehicle via the gladhand; interpret an air pressure from the tow vehicle; and, in response to the air pressure exceeding a threshold air pressure, identify a braking force applied to the driven axle 137 from the pneumatic or mechanical brake system of the trailer 140 and trigger the motor 131 to disable torque output to the driven axle 137 in tow mode. Then, the controller 150 can interface with the integrated controller of the kingpin no to: detect a force applied to the kingpin by the hitch based on the second signal output by the set of force sensors; and access a target preload force on the kingpin 110. Then, in response to the force exceeding the target preload force, the controller 150 can trigger the motor 131 to supply a first electrical energy flux to the battery assembly 120 in the regenerative braking mode. The controller 150 can then: detect loss of traction at the driven axle 137 (e.g., between the left driven wheel 138 and a ground surface) based on a signal output by the set of wheel speed sensors; and, in response to detecting loss of traction at the driven axle 137 and in response to the force exceeding the target preload force, trigger the motor 131 to supply a second electrical energy flux, less than the first electrical energy flux, to the first battery assembly 120 in the regenerative braking mode to reduce the proportion of regenerative braking output to the driven axle 137.

In the regenerative braking mode, the controller 150 can then: detect a presence of traction at the driven axle 137 (e.g., between the left driven wheel 138 and the ground surface) based on a next signal output by the set of wheel speed sensors; and, in response to detecting presence of traction at the driven axle 137, automatically trigger the motor 131 to supply the first electrical energy flux to the battery assembly 120 to increase regenerative braking to the driven axle 137 (e.g., the left driven wheel 138).

Therefore, the controller 150 can leverage air signals received from the tow vehicle via the gladhand, the target preload force, and signals output from the set of wheel speed sensors to automatically apply a proportion of braking force to the driven axle 137 from the pneumatic or mechanical brake system of the trailer 140 and/or regeneratively brake the driven axle 137, and thereby, maintain traction between the driven wheels of the trailer 140 and a ground surface.

10.3 Variation: Air-Ride Suspension System+Weight on Driven Axle

Figure 3A:
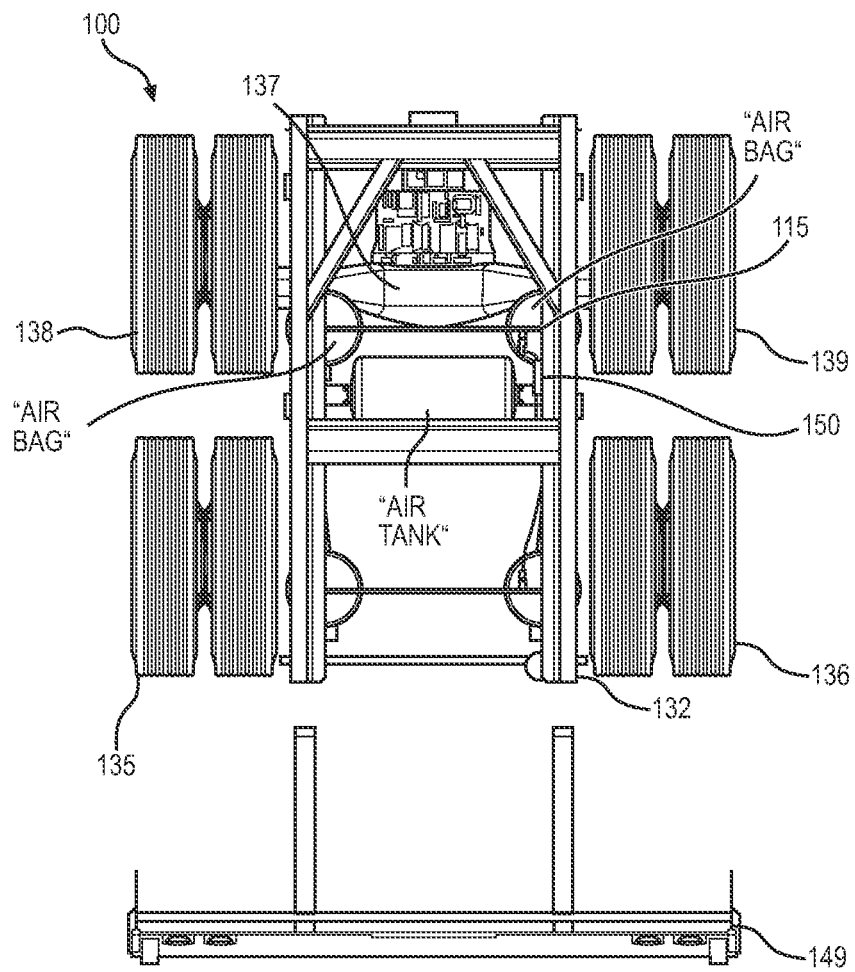
FIGS. 3A, 3B, 3C, and 3D are schematic representations of one variation of the system.
Figure 3B:
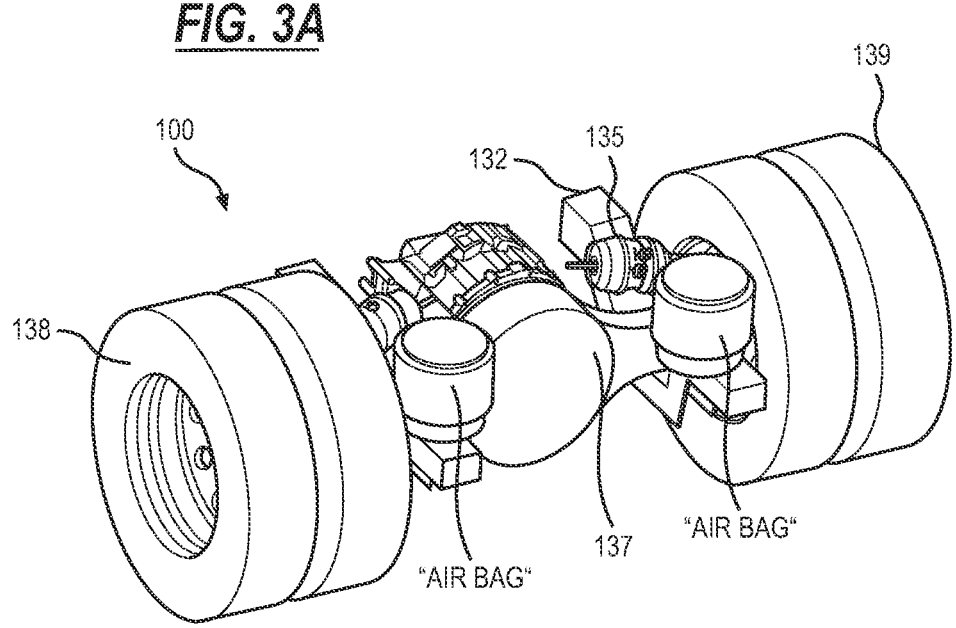
Figure 3C:
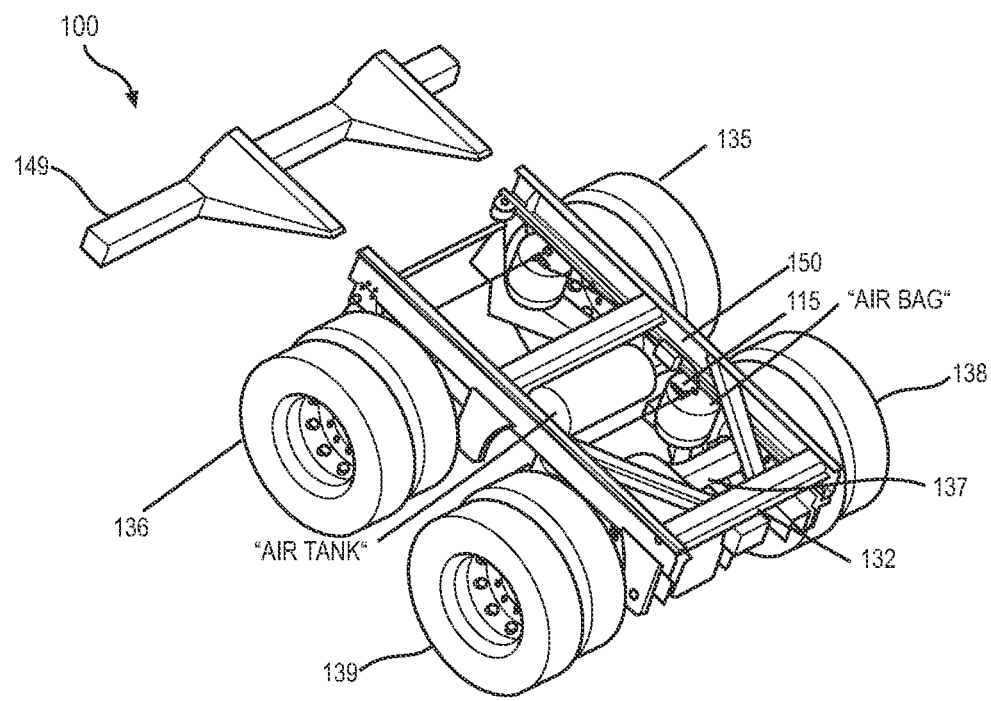
Figure 3D:
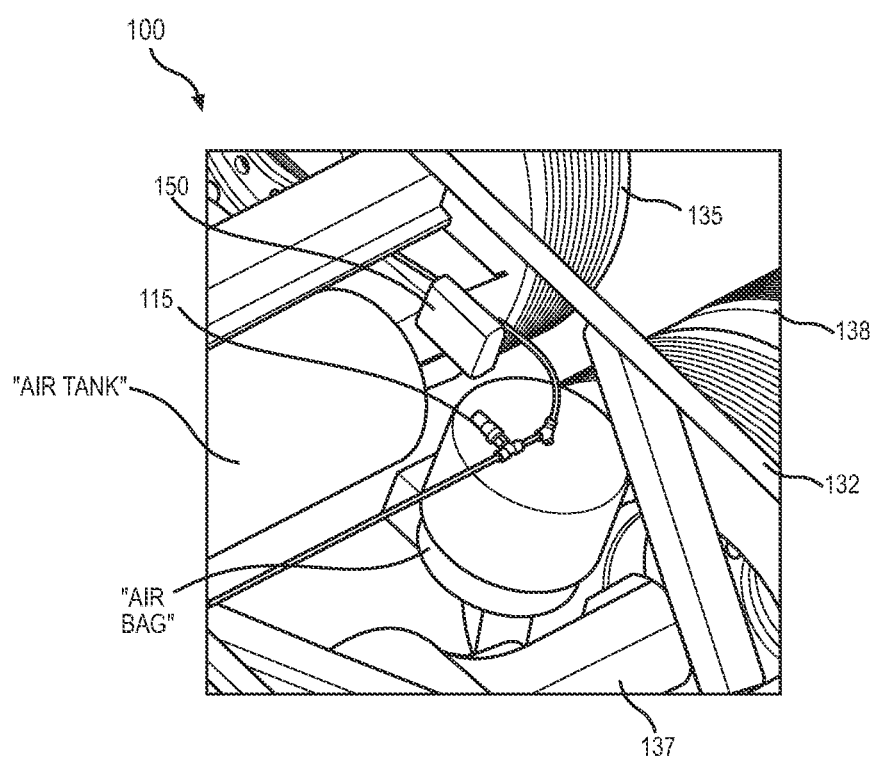

In one variation, as shown in FIGS. 3A and 3B, the bogie 130 can further include an air-ride suspension system coupled to the driven axle 137 and a pressure sensor 115 configured to output signals representing combined air pressures of air bags in the air-ride suspension system. The controller 150 can then leverage these combined air pressures to approximate a weight of the trailer 149 (e.g., a load, a payload) on the driven axle 137 and then selectively trigger the motor 131 to apply positive torque to the driven axle 137 and/or to regeneratively brake the driven axle 137 to (e.g., apply negative torque to the driven axle 137) of the trailer 140 to slow motion of the trailer 140.

For example, the bogie 130 can include an air-ride suspension system coupled to the driven axle 137. The air-ride suspension system includes: a first air bag arranged proximal the left driven wheel 138; and a second air bag arranged proximal the right driven wheel 139. The bogie 130 can further include a pressure sensor 115 coupled to the driven axle 137 and configured to output a signal representing a combined air pressure in the first air bag and the second air bag. The controller 150 can then interface with the integrated controller of the kingpin 110 to: detect a force applied to the kingpin by a hitch of a tow vehicle; detect a direction of motion of the trailer 140 (e.g., forward direction); and access a target preload force. The controller 150 can detect a first combined air pressure in the first air bag and the second air bag based on the signal output by the pressure sensor 115. Then, in response to the first combined air pressure in the first air bag and the second air bag exceeding a threshold air pressure and in response to the first force falling below the target preload force, the controller 150 can: trigger the motor 131 to disable torque output to the driven axle 137; enter a regenerative braking mode; and trigger the motor 131 to supply an electrical energy flux to the battery assembly 120 to regeneratively brake the driven axle 137 in the regenerative braking mode.

In another variation, the controller 150 can: detect an air pressure of an air-ride suspension system coupled to the driven axle 137 (e.g., via a pressure sensor 115); approximate a weight (e.g., a load, a payload) of the trailer 140 on the driven axle 137 based on the air pressure. Further, a user (e.g., an operator, a manager, a driver) can define a threshold weight (e.g., a weight limit, a weight standard) for each driven axle 137 and the controller 150 can leverage this threshold weight to adjust target regenerative braking proportional to the approximated weight of the trailer 140 on the driven axle 137.

For example, the controller 150 can interface with the integrated controller of the kingpin no to: detect a force applied to the kingpin by a hitch of a tow vehicle; detect a direction of motion of the trailer 140 (e.g., forward direction); and access a target preload force. The controller 150 can then: interpret a weight of the trailer 140 on the driven axle 137 (e.g., 34,500 pounds) based on the first combined air pressure; and, in response to the weight (e.g., 34,500 pounds) exceeding a threshold weight for the driven axle 137 (e.g., 34,000 pounds) and in response to the force exceeding the target preload force, trigger the set of latches 133 to disengage with corresponding engagement features 144 along the set of rails 147 in an open position; trigger the motor 131 to supply an electrical energy flux to the battery assembly 120 to regeneratively brake the driven axle 137 in the regenerative braking mode to redistribute the weight throughout the trailer 140; and trigger the set of latches 133 to engage corresponding engagement features 144 along the set of rails 147 in a closed position.

Therefore, the controller 150 can interpret air pressures from the air-ride suspension system of the trailer 140 and leverage these air pressures to trigger the motor 131 to disable torque output to the driven axle 137 and/or to regeneratively brake the driven axle 137 to adjust the longitudinal position of the bogie 130. Additionally, the controller 150 can leverage these air pressures to interpret a weight of the trailer on the driven axle 137 and trigger the motor 131 to regeneratively brake the driven axle 137 and apply a negative torque to the driven axle 137 to achieve a weight balance of the trailer 140 on the driven axle 137.

11. Variation: Service Mode

In one variation, the bogie 130 further includes a secondary battery assembly 122 mounted to the chassis 132 of the bogie 130, and the controller 150 can trigger the secondary battery assembly 122 to supply electrical energy to the motor 131 to assist motion of the bogie 130 away from the trailer 140 and thus, enable a user to service the bogie 130 in a service mode.

For example, a user may wish to service the bogie 130 such as to: replace the motor 131 or the driven axle 137; clean the bogie 130; and/or remove and replace the bogie 130. The user may align the bogie 130 with the distal end 149 of the trailer 140 and manually disengage the set of latches 133 from corresponding engagement features 144 on the set of rails 147. Then, the controller 150 can: detect the set of latches 133 disengaged from the corresponding engagement features 144 on the left rail 147 and on the right rail 147; and, in response to the set of latches 133 disengaging from the corresponding engagement features 144, enter a service mode. In the service mode, the controller 150 can then trigger the secondary battery assembly 120 to supply electrical energy to the motor 131 to output torque to the driven axle 137 to assist motion of the bogie 130 away from the trailer 140 responsive to a user input. The user may then remove the bogie 130 from the floor 146 of the trailer 140 for service and then drive the serviced bogie 130 toward the proximal end 148 of the trailer 140 to engage the set of latches 133 with corresponding engagement features 144 on the set of rails 147. The user may drive the bogie 130 to a target longitudinal position to retain the bogie below the floor 146 of the trailer 140 and manually engage the clamp to prevent motion of the bogie 130 away from the trailer 140.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for tow control of a trailer comprising:
   the trailer comprising:
   a floor;
   a left rail:
   coupled to the floor;
   extending parallel to and laterally offset from a longitudinal centerline of the trailer; and
   defining a first array of engagement features distributed along the left rail and longitudinally offset by a pitch distance; and
   a right rail:
   coupled to the floor;
   extending parallel to and laterally offset from the longitudinal centerline of the trailer opposite the left rail; and
   defining a second array of engagement features distributed along the right rail and longitudinally offset by the pitch distance;
   a bogie comprising:
   a chassis configured to transiently install on the left rail and the right rail of the trailer over a range of longitudinal positions;
   a first set of latches configured to transiently engage a first subset of engagement features, in the first array of engagement features on the left rail and in the second array of engagement features on the right rail, to retain the bogie below the floor of the trailer;
   a driven axle suspended from the chassis; and
   a motor coupled to the driven axle;
   a first battery assembly comprising:
   a second set of latches configured to transiently engage a second subset of engagement features, in the first array of engagement features on the left rail and in the second array of engagement features on the right rail, to retain the first battery assembly below the floor of the trailer; and
   a controller configured to:
   trigger the first battery assembly to supply electrical energy to the motor to output torque to the driven axle in a tow mode; and
   trigger the motor to supply electrical energy to the first battery assembly to regeneratively brake the driven axle and charge the first battery assembly in a regenerative braking mode.

2. The system of claim 1:
   wherein, in a first configuration:

the battery assembly is arranged in a first longitudinal position adjacent a proximal end of the trailer; and
the bogie is arranged in a second longitudinal position on a distal end of the trailer, opposite the proximal end, within a threshold distance of the battery assembly to balance a weight of the trailer, containing a first load, on the driven axle; and wherein, in a second configuration:
the bogie is arranged in the first longitudinal position on the proximal end of the trailer; and
the battery assembly is arranged in the second longitudinal position on the distal end of the trailer within the threshold distance of the bogie to balance the weight of the trailer, containing a second load different from the first load, on the driven axle.

3. The system of claim 1:
wherein the first battery assembly is arranged below the floor of the trailer adjacent a proximal end of the bogie; and
further comprising a second battery assembly:
comprising a third set of latches configured to transiently engage a third subset of engagement features, in the first array of engagement features on the left rail and in the second array of engagement features on the right rail, to retain the second battery assembly below the floor of the trailer; and
arranged below the floor of the trailer proximal a distal end of the bogie opposite the first battery assembly.

4. The system of claim 3:
wherein the first battery assembly and the second battery assembly are characterized by a combined battery capacity within a target capacity range between 100 kilowatt-hours and 400 kilowatt-hours; and
wherein the controller is further configured to:
trigger the first battery assembly to supply a first portion of electrical energy to the motor; and
trigger the second battery assembly to supply a second portion of electrical energy to the motor to output torque to the driven axle in the tow mode.

5. The system of claim 3:
wherein the second battery assembly is configured to:
supply electrical energy to a refrigeration system of the trailer; and
store electrical energy from the motor in a regenerative braking mode;
wherein the first battery assembly and the second battery assembly are characterized by a combined battery capacity within a target capacity range between 280 kilowatt-hours and 750 kilowatt-hours; and
wherein the controller is further configured to:
trigger the first battery assembly and the second battery assembly to supply a first electrical energy flux to the motor to output torque to the driven axle;
trigger the first battery assembly and the second battery assembly to supply a second electrical energy flux, different from the first electrical energy flux, to the refrigeration system to maintain a target temperature of the trailer in a tow mode; and
trigger the motor to supply electrical energy to the first battery assembly and the second battery assembly to charge the first battery assembly and the second battery assembly in a regenerative braking mode.

6. The system of claim 1:
wherein the bogie further comprises a secondary battery assembly integrated into the chassis of the bogie; and
wherein the controller is further configured to:
detect the first set of latches disengaged from the first subset of engagement features, in the first array of engagement features on the left rail and in the second array of engagement features on the right rail;
in response to the first set of latches disengaging from the first subset of engagement features, enter a service mode; and
in the service mode, trigger the secondary battery assembly to supply electrical energy to the motor to output torque to the driven axle to assist motion of the bogie away from the trailer in response to a user input.

7. The system of claim 1:
wherein the driven axle comprises a left driven wheel and a right driven wheel;
wherein the motor is coupled to a left side of the driven axle and laterally offset from the longitudinal centerline of the trailer;
further comprising a second motor coupled to a right side of the driven axle and laterally offset from the longitudinal centerline of the trailer opposite the left motor; and
wherein the controller is further configured to:
detect motion of the trailer in a forward direction;
in tow mode:
trigger the first battery assembly to supply a first electrical energy flux to the motor to output torque to the left driven wheel in the forward direction of motion; and
trigger the first battery assembly to supply the first electrical energy flux to the second motor to output torque to the right driven wheel in the forward direction of motion; and
in regenerative braking mode:
trigger the motor to supply a second electrical energy flux, different from the first electrical energy flux, to the first battery assembly to regeneratively brake the left driven wheel in a reverse direction of motion; and
trigger the second motor to supply the second electrical energy flux to the first battery assembly to regeneratively brake the right driven wheel in the reverse direction of motion.

8. The system of claim 1:
further comprising:
a kingpin comprising:
a head;
a base coupled to a proximal end of the trailer opposite the bogie;
a shank:
interposed between the head and the base; and
configured to transiently couple to a hitch of a tow vehicle; and
a set of sensors configured to output a signal representing forces applied to the kingpin; and
wherein the controller is further configured to:
access the signal from the set of sensors;
detect a first force applied to the kingpin by the hitch based on the signal;
detect a direction of motion and an incline angle of the trailer;
detect a charge state of the first battery assembly;
calculate a target preload force opposite the direction of motion and inversely proportional to the incline angle and the charge state; and
in response to the first force falling below the target preload force, trigger the motor to increase torque output in the direction of motion to decrease a difference between the first force and the target preload force in the tow mode.

9. The system of claim 8:
wherein the kingpin is coupled to the floor adjacent the proximal end of the trailer via a set of fasteners;
wherein the shank:
   defines a first sensor receptacle extending parallel to a lateral axis of the trailer; and
   defines a second sensor receptacle extending parallel to a longitudinal axis of the trailer;
wherein the set of sensors comprises:
   a first strain gauge arranged in the first sensor receptacle and configured to output a first signal representing shear forces in the kingpin parallel to the lateral axis; and
   a second strain gauge arranged in the second sensor receptacle and configured to output a second signal representing shear forces in the kingpin parallel to the longitudinal axis; and
wherein the controller is further configured to:
   calculate a first direction and a first magnitude of the first force applied to the kingpin by the hitch based on the signal from the set of sensors; and
   the motor to output a first torque in the first direction of the first force and proportional to the first magnitude of the first force in the tow mode.

10. The system of claim 8:
wherein the driven axle comprises a left driven wheel and a right driven wheel;
wherein the motor is coupled to the driven axle parallel to the longitudinal centerline of the trailer; and
wherein the controller is further configured to:
   detect a motion of the trailer in a forward direction;
   detect a decline angle of the trailer;
   calculate a first target preload force opposite the motion of the trailer and proportional to the decline angle of the trailer; and
   in response to the first force exceeding the first target preload force, trigger the motor to supply the first electrical energy flux to the first battery assembly to regeneratively brake the left driven wheel and the right driven wheel to slow motion of the trailer and decrease a difference between the first force and the first target preload force.

11. The system of claim 1:
wherein the bogie further comprises:
   a compressed-air-brake system configured to:
      couple to a gladhand of a tow vehicle; and
      brake the driven axle responsive to an air signal received from the tow vehicle via the gladhand; and
   a set of wheel speed sensors coupled to the driven axle and configured to output a first signal;
further comprising a kingpin:
   coupled to a proximal end of the trailer opposite the bogie;
   configured to couple to a hitch of the tow vehicle; and
   a set of force sensors configured to output a second signal representing forces applied to the kingpin; and
wherein the controller is further configured to:
   detect a first force applied to the kingpin by the hitch based on the second signal output by the set of force sensors;
   access a target preload force on the kingpin;
   in response to the first force exceeding the target preload force, trigger the motor to supply a first electrical energy flux to the first battery assembly in the regenerative braking mode;
   detect loss of traction at the driven axle based on the first signal output by the set of wheel speed sensors; and
   in response to detecting loss of traction at the driven axle and in response to the first force exceeding the target preload force, trigger the motor to supply a second electrical energy flux, less than the first electrical energy flux, to the first battery assembly in the regenerative braking mode.

12. The system of claim 11:
wherein the driven axle comprises:
   a left driven wheel;
   a right driven wheel;
   an air-ride suspension system coupled to the driven axle and comprising:
      a first air bag arranged proximal the left driven wheel; and
      a second air bag arranged proximal the right driven wheel; and
   a pressure sensor coupled to the driven axle and configured to output a first signal representing a combined air pressure in the first air bag and the second air bag; and
wherein the controller is further configured to:
   detect a first combined air pressure in the first air bag and the second air bag based on the first signal output by the pressure sensor; and
   in response to the first combined air pressure in the first air bag and the second air bag exceeding a threshold air pressure and in response to the first force falling below the target preload force:
      trigger the battery assembly to supply a third electrical energy flux to the motor to increase torque output to the driven axle in the tow mode; and
      trigger the motor to supply a fourth electrical energy flux, greater than the first third electrical energy flux, to the first battery assembly to regeneratively brake the driven axle in the regenerative braking mode.

13. The system of claim 1:
further comprising a pressure sensor configured to output signals corresponding to air pressure of an emergency brake line at the trailer from a tow vehicle; and
wherein the controller is further configured to:
   interpret a first air pressure of the emergency brake line of the trailer based on a first signal received from the pressure sensor;
   in response to the first air pressure exceeding a threshold air pressure, enter a maximum regenerative braking mode; and
   in the maximum regenerative braking mode, trigger the motor to supply a maximum electrical energy flux to the first battery assembly to regeneratively brake the driven axle and charge the battery assembly.

14. The system of claim 1:
further comprising a pressure sensor coupled to a spring-brake relay of a tow vehicle and configured to output signals corresponding to air pressures at the spring-brake relay from an air supply of the tow vehicle; and
wherein the controller is further configured to:
   at a first time:
      access a first signal from the pressure sensor;
      interpret a first air pressure at the spring-brake relay based on the first signal; and in the tow mode, trigger the first battery assembly to supply electrical energy to the motor to output a first torque to the driven axle; and at a second time:
 access a second signal from the pressure sensor;
 interpret a second air pressure at the spring-brake relay based on the second signal;
 detect a difference between the first air pressure and the second air pressure; and
 in response to detecting the difference falling below a threshold pressure difference, enter the regenerative braking mode.

15. A system for tow control of a trailer comprising:
the trailer comprising:
 a floor;
 a left rail:
  coupled to the floor;
  extending parallel to and laterally offset from a longitudinal centerline of the trailer; and
  defining a first array of engagement features distributed along the left rail and longitudinally offset by a pitch distance; and
 a right rail:
  coupled to the floor;
  extending parallel to and laterally offset from the longitudinal centerline of the trailer opposite the left rail; and
  defining a second array of engagement features distributed along the right rail and longitudinally offset by the pitch distance;
a bogie:
 comprising a chassis;
 comprising a first set of latches configured to transiently engage a first subset of engagement features, in the first array of engagement features and in the second array of engagement features, to retain the bogie below the floor of the trailer;
 comprising a driven axle suspended from the chassis; and
 arranged in a first longitudinal position on the trailer; and
a battery assembly:
 comprising a second set of latches configured to transiently engage a second subset of engagement features, in the first array of engagement features and in the second array of engagement features, to retain the battery assembly below the floor of the trailer adjacent the bogie; and
 arranged in a second longitudinal position on the trailer within a threshold distance of the bogie to balance a weight of the trailer, containing a load, on the driven axle.

16. The system of claim 15, further comprising:
a kingpin comprising:
 a head;
 a base coupled to a proximal end of the trailer opposite the bogie;
 a shank:
  interposed between the head and the base; and
  configured to transiently couple to a hitch of a tow vehicle; and
 a set of sensors configured to output signals representing forces applied to the kingpin; and
a controller configured to:
 calculate a first direction of a first force applied to the kingpin by the hitch based on a first signal received from the set of sensors;
 calculate a second direction of a second force applied to the kingpin by the hitch based on a second signal received from the set of sensors; and
 response to detecting the second direction of the second force opposite the first direction of the first force, trigger the motor to supply electrical energy to the battery assembly to regeneratively brake the driven axle and charge the battery assembly in a regenerative braking mode.

17. The system of claim 15:
wherein the chassis is configured to transiently install on the left rail and the right rail of the trailer over a range of longitudinal positions; and
wherein in a first configuration:
 the bogie is arranged below the floor and on a distal end of the trailer;
 each latch in the first set of latches is engaged with a corresponding engagement feature in the first array of engagement features and in the second array of engagement features;
 the battery assembly is arranged below the floor of the trailer, adjacent the bogie, and within the threshold distance of a proximal end of the trailer opposite the distal end; and
 each latch in the second set of latches is engaged with a corresponding engagement feature in the first array of engagement features and in the second array of engagement features.

18. A system for tow control of a trailer comprising:
a bogie comprising:
 a chassis configured to transiently install on a left rail and a right rail of the trailer over a range of longitudinal positions;
 a first set of latches configured to transiently engage a first subset of engagement features, in a first array of engagement features on the left rail and in a second array of engagement features on the right rail, to retain the bogie below a floor of the trailer;
 a driven axle suspended from the chassis; and
 a motor coupled to the driven axle;
a battery assembly comprising:
 a second set of latches configured to transiently engage a second subset of engagement features, in the first array of engagement features on the left rail and in the second array of engagement features on the right rail, to retain the battery assembly below the floor of the trailer;
a pressure sensor coupled to a spring-brake relay of a tow vehicle and configured to output signals corresponding to air pressures at the spring-brake relay from an air supply of the tow vehicle; and
a controller configured to:
 at a first time:
  access a first signal from the pressure sensor;
  interpret a first air pressure at the spring-brake relay based on the first signal; and
  in a tow mode, trigger the battery assembly to supply electrical energy to the motor to output torque to the driven axle; and
 at a second time:
  access a second signal from the pressure sensor;
  interpret a second air pressure at the spring-brake relay based on the second signal;
  detect a difference between the first air pressure and the second air pressure;

in response to detecting the difference falling below a threshold pressure difference, enter a regenerative braking mode.

19. A system for tow control of a trailer comprising:
a battery assembly comprising:
 a first set of latches configured to transiently engage a first subset of engagement features, in a first array of engagement features on a left rail and in a first array of engagement features on a right rail, to retain the battery assembly below a floor of the trailer;
a bogie comprising:
 a chassis;
 a second set of latches configured to transiently engage a second subset of engagement features, in a second array of engagement features on the left rail and in a second array of engagement features on the right rail, to retain the bogie below the floor of the trailer;
 a secondary battery assembly integrated into the chassis;
 a driven axle suspended from the chassis; and
 a motor coupled to the driven axle; and
a controller configured to:
 in a tow mode, trigger the battery assembly to supply electrical energy to the motor to output torque to the driven axle;
 in a regenerative braking mode, trigger the motor to supply electrical energy to the battery assembly to regeneratively brake the driven axle and charge the battery assembly; and
 in a service mode, trigger the secondary battery assembly to supply electrical energy to the motor to output torque to the driven axle to assist motion of the bogie away from the trailer in response to a user input.

20. A system for tow control of a trailer comprising:
the trailer comprising:
 a floor;
 a left rail:
  coupled to the floor;
  extending parallel to and laterally offset from a longitudinal centerline of the trailer; and
  defining a first array of engagement features distributed along the left rail and longitudinally offset by a pitch distance; and
 a right rail:
  coupled to the floor;
  extending parallel to and laterally offset from the longitudinal centerline of the trailer opposite the left rail; and
  defining a second array of engagement features distributed along the right rail and longitudinally offset by the pitch distance;
a bogie comprising:
 a chassis;
 a first set of latches configured to transiently engage a first subset of engagement features, in the first array of engagement features and in the second array of engagement features, to retain the bogie below the floor of the trailer;
 a driven axle suspended from the chassis; and
 a motor coupled to the driven axle;
a battery assembly:
 comprising a second set of latches configured to transiently engage a second subset of engagement features, in the first array of engagement features and in the second array of engagement features, to retain the battery assembly below the floor of the trailer adjacent the bogie;
a pressure sensor configured to output signals corresponding to air pressure of an emergency brake line at the trailer from a tow vehicle; and
a controller configured to:
 in a tow mode, trigger the battery assembly to supply electrical energy to the motor to output torque to the driven axle;
 interpret a first air pressure of the emergency brake line of the trailer based on a first signal received from the pressure sensor;
 in response to the first air pressure exceeding a threshold air pressure, enter a maximum regenerative braking mode; and
 in the maximum regenerative braking mode, trigger the motor to supply a maximum electrical energy flux to the first battery assembly to regeneratively brake the driven axle and charge the battery assembly.

* * * * *